(12) United States Patent
Kothari et al.

(10) Patent No.: US 11,511,486 B2
(45) Date of Patent: Nov. 29, 2022

(54) DETECTING THREE-DIMENSIONAL (3D) PART DRAG

(71) Applicant: Hewlett-Packard Development Company, L.P., Spring, TX (US)

(72) Inventors: Sunil Kothari, Palo Alto, CA (US); Tod Heiles, Sumner, WA (US); Luke Bockman, Vancouver, WA (US); Gary J. Dispoto, Palo Alto, CA (US); Md Abdullah Al Hafiz Khan, Palo Alto, CA (US); Todd Goyen, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/256,674

(22) PCT Filed: Jan. 23, 2019

(86) PCT No.: PCT/US2019/014712
§ 371 (c)(1),
(2) Date: Dec. 29, 2020

(87) PCT Pub. No.: WO2020/153949
PCT Pub. Date: Jul. 30, 2020

(65) Prior Publication Data
US 2021/0339470 A1    Nov. 4, 2021

(51) Int. Cl.
*B29C 64/188* (2017.01)
*B33Y 50/02* (2015.01)
(Continued)

(52) U.S. Cl.
CPC .......... *B29C 64/188* (2017.08); *B29C 64/165* (2017.08); *B29C 64/209* (2017.08); *B29C 64/218* (2017.08); *B29C 64/268* (2017.08); *B29C 64/393* (2017.08); *B33Y 40/20* (2020.01); *B33Y 50/02* (2014.12); *G06T 7/001* (2013.01);
(Continued)

(58) Field of Classification Search
CPC ... B29C 64/188; B29C 64/165; B29C 64/209; B29C 64/218; B29C 64/268; B29C 64/393; B29C 64/194; B33Y 40/20; B33Y 50/02; B33Y 10/00; B33Y 30/00; G06T 7/001;
(Continued)

(56) References Cited

U.S. PATENT DOCUMENTS 7,181,059 B2 *  2/2007  Duvdevani .......... G06V 10/752
                                                      382/199
8,784,721 B2     7/2014  Philippi et al.
(Continued)

FOREIGN PATENT DOCUMENTS

CN    105044154 A    11/2015
CN    106903315 A     6/2017
(Continued)

*Primary Examiner* — Nahida Sultana
(74) *Attorney, Agent, or Firm* — Fabian VanCott

(57) ABSTRACT

A system for detecting three-dimensional (3D) part drag includes an infrared image capture device to capture a plurality of thermal images of a 3D part build region of a 3D printing device on which a part is built, and an image analysis module to detect drag of the part based on a difference image produced by subtracting a first thermal image from a second thermal image.

20 Claims, 13 Drawing Sheets

(51) Int. Cl.

| | |
|---|---|
| *B29C 64/209* | (2017.01) |
| *B29C 64/393* | (2017.01) |
| *B29C 64/268* | (2017.01) |
| *B29C 64/165* | (2017.01) |
| *B29C 64/218* | (2017.01) |
| *B33Y 40/20* | (2020.01) |
| *G06T 7/00* | (2017.01) |
| *B33Y 10/00* | (2015.01) |
| *B33Y 30/00* | (2015.01) |

(52) U.S. Cl.
CPC ............... *B33Y 10/00* (2014.12); *B33Y 30/00* (2014.12); *G06T 2207/10048* (2013.01); *G06T 2207/30164* (2013.01)

(58) Field of Classification Search
CPC . G06T 2207/10048; G06T 2207/30164; G06F 3/1208; G06F 3/1259
See application file for complete search history.

(56) References Cited

U.S. PATENT DOCUMENTS

| | | | |
|---|---|---|---|
| 9,718,129 B2 | 8/2017 | Ljungblad et al. | |
| 9,724,876 B2 | 8/2017 | Cheverton et al. | |
| 9,855,698 B2 | 1/2018 | Perez et al. | |
| 9,919,360 B2 | 3/2018 | Buller et al. | |
| 10,046,412 B2 | 8/2018 | Blackmore | |
| 10,048,661 B2 | 8/2018 | Arthur | |
| 10,065,270 B2 | 9/2018 | Buller et al. | |
| 10,834,283 B2* | 11/2020 | d'Armancourt | G06T 7/0002 |
| 2010/0033565 A1* | 2/2010 | Benzerrouk | G06T 7/0004 |
| | | | 348/E5.022 |
| 2015/0115490 A1 | 4/2015 | Reinarz | |
| 2016/0224017 A1 | 8/2016 | Huang et al. | |
| 2016/0236414 A1 | 8/2016 | Reese et al. | |
| 2017/0001379 A1 | 1/2017 | Long | |
| 2017/0056970 A1 | 3/2017 | Chin et al. | |
| 2017/0266886 A1 | 9/2017 | Hess et al. | |
| 2017/0326867 A1 | 11/2017 | Hartke et al. | |
| 2017/0355147 A1 | 12/2017 | Buller et al. | |
| 2018/0104742 A1 | 4/2018 | Kottilingam et al. | |
| 2018/0124341 A1 | 5/2018 | Harding et al. | |
| 2018/0169948 A1 | 6/2018 | Coeck et al. | |
| 2018/0186067 A1* | 7/2018 | Buller | B23K 26/34 |
| 2018/0186080 A1 | 7/2018 | Milshtein et al. | |
| 2019/0108396 A1* | 4/2019 | Dal Mutto | G06V 20/52 |
| 2019/0303711 A1* | 10/2019 | Kalivas | G06K 9/6267 |

FOREIGN PATENT DOCUMENTS

| | | |
|---|---|---|
| DE | 102017107610 A1 | 10/2017 |
| EP | 3205483 A1 | 8/2017 |
| JP | 2007171149 A | 7/2007 |
| WO | WO-2016094827 A1 | 6/2016 |
| WO | WO-2017196345 A1 | 11/2017 |

* cited by examiner

DETECTING THREE-DIMENSIONAL (3D) PART DRAG

BACKGROUND

Three-dimensional (3D) printing is dramatically changing the manufacturing landscape. Via 3D printing, articles and components may be manufactured without the resources of a factory or other large-scale production facility. Additive manufacturing systems produce three-dimensional (3D) objects by building up layers of material and combining those layers using adhesives, heat, chemical reactions, and other coupling processes. Some additive manufacturing systems may be referred to as "3D printing devices." The additive manufacturing systems make it possible to convert a computer aided design (CAD) model or other digital representation of an object into a physical object. Digital data is processed into slices each defining that part of a layer or layers of build material to be formed into the object.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
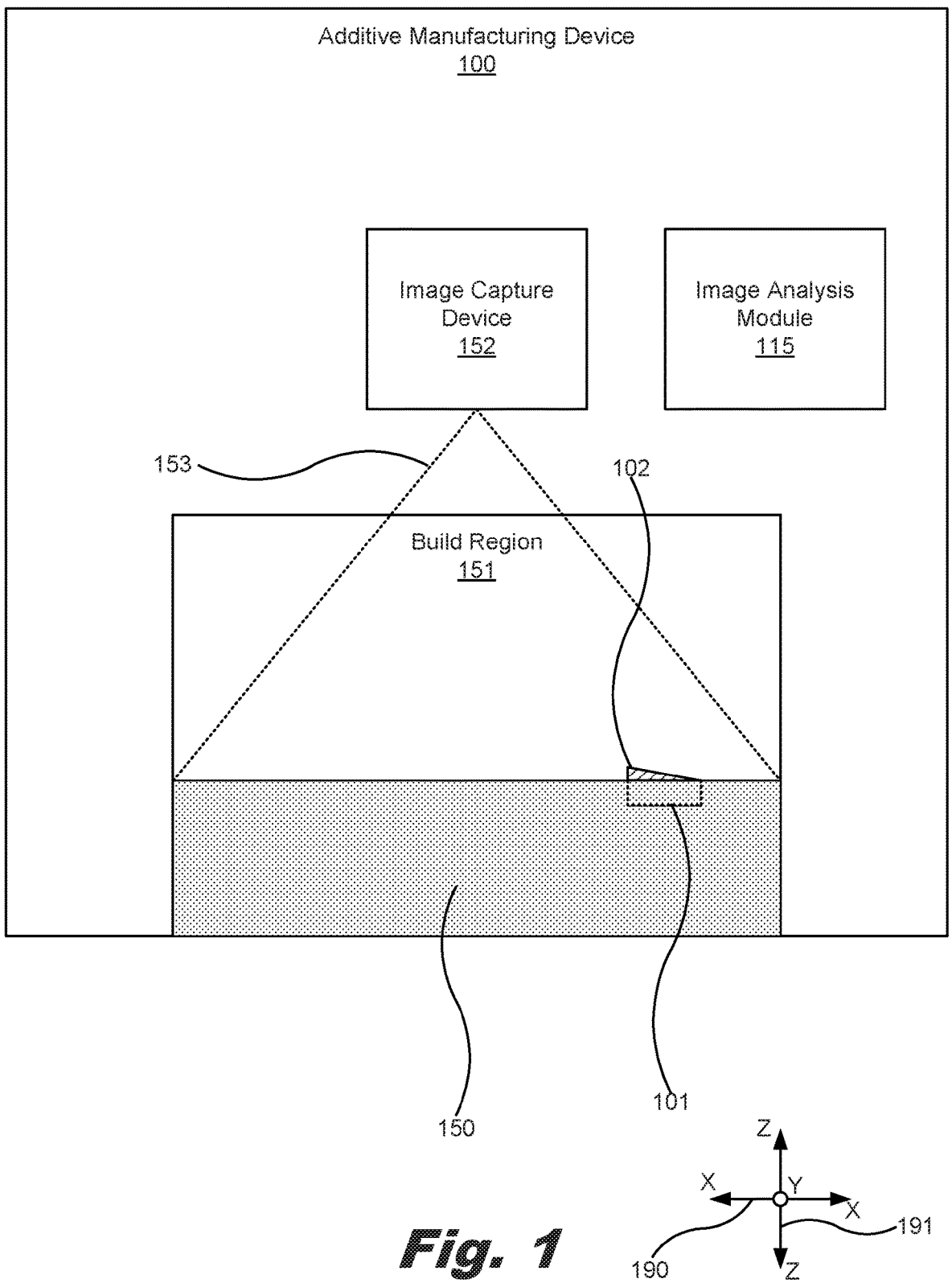
FIG. 1 is an elevational block diagram of an additive manufacturing device, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Examples provided herein include apparatuses, processes, and methods for generating three-dimensional objects. Apparatuses for generating three-dimensional objects may be referred to as additive manufacturing apparatuses. Example apparatuses described herein may correspond to three-dimensional printing systems, which may also be referred to as three-dimensional printers. In an example additive manufacturing process, a layer of build material may be formed in a build area, a fusing agent may be selectively distributed on the layer of build material, and energy may be temporarily applied to the layer of build material. As used herein, a build layer may refer to a layer of build material formed in a build area upon which agent may be distributed and/or energy may be applied.

Additional layers may be formed and the operations described above may be performed for each layer to thereby generate a three-dimensional object. Sequentially layering and fusing portions of layers of build material on top of previous layers may facilitate generation of the three-dimensional object. The layer-by-layer formation of a three-dimensional object may be referred to as a layer-wise additive manufacturing process.

In examples described herein, a build material may include a powder-based build material, where powder-based build material may comprise wet and/or dry powder-based materials, particulate materials, and/or granular materials. In some examples, the build material may be a weak light absorbing polymer. In some examples, the build material may be a thermoplastic. Furthermore, as described herein, agent may comprise fluids that may facilitate fusing of build material when energy is applied. In some examples, agent may be referred to as coalescing or fusing agent. In some examples, agent may be a light absorbing liquid, an infrared or near infrared absorbing liquid, such as a pigment colorant. In some examples at least two types of agent may be selectively distributed on a build layer. In some examples at least one agent may inhibit fusing of build material when energy is applied.

Example apparatuses may comprise an agent distributor. In some examples, an agent distributor may comprise at least one fluid ejection device. A fluid ejection device may comprise at least one printhead (e.g., a thermal ejection based printhead, a piezoelectric ejection based printhead, etc.). An agent distributor may be coupled to a scanning carriage, and the scanning carriage may move along a scanning axis over the build area. In one example, printheads suitable for implementation in commercially available inkjet printing devices may be implemented as an agent distributor. In other examples, an agent distributor may comprise other types of fluid ejection devices that selectively eject small volumes of fluid.

In some examples, an agent distributor may comprise at least one fluid ejection device that comprises a plurality of fluid ejection dies arranged generally end-to-end along a width of the agent distributor. In some examples, the at least one fluid ejection device may comprise a plurality of printheads arranged generally end-to-end along a width of the agent distributor. In such examples, a width of the agent distributor may correspond to a dimension of a build area. For example, a width of the agent distributor may correspond to a width of a build area. An agent distributor may selectively distribute agent on a build layer in the build area concurrent with movement of the scanning carriage over the build area. In some example apparatuses, the agent distributor may comprise nozzles including nozzle orifices through which agent may be selectively ejected. In such examples, the agent distributor may comprise a nozzle surface in which a plurality of nozzle orifices may be formed.

In some examples, apparatuses may comprise a build material distributor to distribute build material in the build area. A build material distributor may comprise, for example, a wiper blade, a roller, and/or a spray mechanism. In some examples, a build material distributor may be coupled to a scanning carriage. In these examples, the build material distributor may form build material in the build area as the scanning carriage moves over the build area along the scanning axis to thereby form a build layer of build material in the build area.

When the surface temperature of the initial layers of a part in the build region of the additive manufacturing device drops below a crystallization onset temperature of approximately 153° C. long enough for crystallization to initiate, the part will begin to shrink and curl as it crystallizes. The part may initially curl on the perimeter portions of the part due to greater cooling to the surrounding build material such as a powder. As the part curls, the part will lift off of the bed surface and become elevated relative to the surrounding build material. The elevated part may then collide with translating devices within the additive manufacturing device such as a spreader roller, hopper, an energy emitting device, and/or a printing agent dispenser initially and may rock back and forth with each pass or may by dragged across the surface of the build region and the build material deposited thereon. The degree of crystallization and part geometry may determine whether the part rocks or is dragged. If part lifting is allowed to continue, the issue of part lifting may, in some instances, cure itself as more fusing agent is applied and the part gains temperature. However, in some instances, the part lifting issue may worsen to the point where it crashes with the translatable elements within the additive manufacturing device. Thus, part lifting and possible part drag is a symptom of out of balance conditions in the build chamber.

The part lifting and possible dragging may occur due to an incorrect calibration in an imaging device such as a forward-looking infrared (FLIR) camera. If the imaging device is improperly calibrated and is reporting temperatures higher than the actual temperature, the additive manufacturing device will not apply an adequate amount of energy to the build material which may result in an actual build region temperature lower than a target temperature. Cold build material temperatures may cause the perimeter of the parts to cool too quickly and cause crystallization, shrink, and curl.

The part lifting and possible dragging may also occur due to a lack of build material. If an inadequate dose of build material is delivered to the build region, the temperature build material in a control region (i.e., region of interest) may cause the proportional-integral derivative (PID) control of the warming lamp power to respond to the change in the build region. This response may cause the warming lamp power to be lowered which may result in the temperature of the build material dropping below the target temperature in some areas of the build region. A lack of build material ruins the build.

The part lifting and possible dragging may also occur due to too much build material. As dose mass of the build material increases beyond a specification of, for example, approximately 7.0 g+/−0.5, more energy may be extracted from the surfaces of the part into the surrounding build material including the dosed mass as it is being spread. This may cause the part surface temperate to drop and may lead to curling. The incoming build material dose acts as a quenching process. If too much heat is removed in the spreading process, the parts will curl and drag at those layers of the build material.

A dose plate heater may also cause parts to curl and drag if the dose plate heater is not providing a correct and uniform temperature of the incoming build material dose. An incoming build material dose that is correct in mass and temperature produces a success build. If the dose mass varies across the build plate, it may create hot and cold swaths on the build region. If the dose temperature varies across the dose plate (i.e. colder in the front and back), cold zones may be created that might cause the parts to curl.

Printing agent dispenser air leaks may also be a cause of part lifting and possible dragging of the parts. The printing agent dispenser includes an internal cooling system. If the seals on the bottom of the printing agent dispenser are leaking and blowing on the build area, the increased convection this leaking causes may cause parts to curl and drag. This may be detected as a cold streak on FLIR camera plots. Further, the build region may include four resistive heaters on the perimeter of the build region. These heaters assist in reducing the thermal roll off in the perimeter of the build area, particularly along the front and rear of the build region. If the resistive heaters are not functioning correctly, the resistive heaters may increase the thermal roll off and result in parts curling and dragging along the front and rear of the build region.

Further, energy emitting device (i.e., a fusing module) may be contaminated with build material along a quartz glass pane located on the bottom of the energy emitting device. This quartz glass pane may become excessively contaminated with burnt on build material. The burnt build material blocks electromagnetic energy from being transmitted from the lamp filament of the energy emitting device to the build material. The reduced energy transfer to the build material causes lower build material temperatures and increased probability of crystallization, curling, and dragging.

Still further, internal energy emitting device contamination may also be a cause of part lifting and possible dragging of the parts. The clean air management system of an additive manufacturing device may not always provide clean cooling air to the energy emitting device. If there is airborne build material in the cooling air, it may burn on the reflectors and lamps of the energy emitting device and may reduce energy transfer into the build material in localized regions. The cooler regions then become potential regions for part curling and dragging. Further, if all four lamps of the energy emitting device are not functioning correctly, the reduced energy emissions from the energy emitting device may result in the additive manufacturing system being out of balance and part and build material temperatures not reaching the process targets.

Further, part lifting or curling defects may occur at a newly-formed bottom surface of a part and may be caused by differential thermal expansion between the top and bottom of the newly solidified thin cross section of the partially-formed part. In some instances, the part lifting may be correlated with, for example, the first ten layers of the part from the bottom surface of newly-applied agent regions in part data defining the part. Upward curl of the part edges relative to the center of the part is a possibility, but reduced spread layer thickness of the build material in the lifted portions of the part may cause higher than expected temperatures at the lifted edges before a drag event.

Large thermal gradients between layers in the bottom surface geology may also cause part lifting. Similarly, a gradient at the surface to hot core transition may also cause part lifting. The gradient may be used to identify lifting, but identification of bottom surface agent density "geology" between layers that cause part lift, and modifying the bottom surface layer density geology may be used to prevent part lift in future parts. To prevent part lift, the gradient may be reduced by increasing the temperature of the build material below the bottom surface. This may be accomplished by adding a lower density of a printing agent such as a fusing agent to heat the build material below the part. However, there may not be enough printing agent to allow the layers of the part to fuse the part together. There may not be enough printing agent to either fuse the build material layers directly below the part, which may impact the color accuracy of the bottom surface since the low tint fusing agent (LTFA) is not completely clear or to heat the layers of the build material below a "release layer" that has no LTFA. This heats the build material at the part's cosmetic surfaces from below without adding tint to the colored cosmetic bottom surface.

Further, preventing or reducing part lift may include, reducing the gradient by increasing the temperature of the bottom-most outer surface layers of the part by adding increased density of LTFA to layers just above the surface. The bottom surfaces may be colder than the upward facing surfaces and may be more sensitive to under-fusing defects than over-fusing defects. The layers of the part may benefit cosmetically as well from higher LTFA loading. Further, adding progressively more fusing agent in transition layers between the surface and the hot core of the part to reduce the high gradient at a hot core boundary of the part.

Part core lift from overheating may occur around large hot core regions of the part well above the bottom surface of the part. The heat transfer to the build material surrounding the part may lead to build material expansion and surface irregularities. The build material expansion and surface irregularities may be correlated with large core regions in the x,y dimensions of the part, and large accumulated z-direction core dimension after approximately fifty layers of the part have been built. The reference or control parts may be printed along with the user's desired parts, and these reference parts may exhibit any print defects such as lifting and potential drag before the user-desired printed parts do. In one example, part lifting may be due to the part not having cooling via a printing agent such as a detailing agent (DA) that is applied to part core regions of the part. Adding DA to the nominal agent density profile of a reference part may reduce the reference part temperature and increase robustness or resistance to these types of defects. Increasing DA levels for part cores that are overheating and causing lift may assist in reducing that lift.

The causes of lift may exhibit similar signatures after they cause a drag event. The dragged tracks viewable along the spread direction of the print region of the build region of the additive manufacturing device fill with deeper build material on a subsequent spread and may cause cold streak regions for several layers. Further, the part may shift or tilt, exposing a deep gap on the side of the part that fills with build material along the edge of the part.

Further, as the layers of build material are deposited in the build area, the fusing agent is selectively distributed on the layers of build material, and energy applied to the layer of build material, the parts may experience fluctuations in temperature, humidity, and other environmental conditions within and without the build area of the 3D printing device. These fluctuations in the environmental conditions may cause defects during the building of the parts. Further, defects within the part may occur as the 3D printing device operates or operates in a deviating manner from its intended mode of operation or in a defective manner. These defects may include a lifting of portions of the part or, stated in another manner, a protrusion of portions of the parts above surrounding build material.

These protrusions may be below a threshold or insignificant enough to not be of a concern to where this type of defect may not significantly affect the look and feel or functionality of the part. Further, the protrusions may not, at these insignificant levels cause the remainder of the 3D printing operations to be affected. However, in many instances, the protrusions may be above the threshold or may be significant enough to cause damage to the part being built and/or cause damage to a number of devices within the 3D printing device. For example, the protrusions in the part may be so severe that the protrusion may come into contact with moveable elements within the 3D printing device such as, for example, a printing carriage including a printing fluid deposition device that is used to deposit the printing fluid onto a layer of build material, a build material deposition device used to deposit the build material within the build region, a build material spreader used to spread the deposited build material in a level plane on the on the build region, a heating element used to heat the build material in preparation for or in order to fuse or sinter the build material, a fusing or sintering device used to fuse or sinter the deposited build material, and combinations thereof.

Because these devices translate across and/or above the surface of the build region, it is possible that the protruding portions of the part may come into contact with the translating devices. This may cause damage to the translating devices as the protrusion of the part comes into contact with the translating devices. For example, dragging of the part may cause clogging of nozzles of a printing fluid deposition device. Further, the contact between the protrusion of the part and the translating devices may cause the part to be pulled or dragged across the build region damaging the protruding part, other parts being built during the same batch, and combinations thereof. Lift or the formation of the protrusions in the part is a precursor to the dragging of the part. Thus, for the reasons described above, it may prove beneficial for the 3D printing device to be able to autonomously detect when a lifting or protrusion of the part occurs, and take remedial action such as discontinuing the build of that part, restarting the build of that part, removing the protrusion from the part, perform other remedial tasks described herein, and combinations thereof.

Examples described herein provide a system for detecting three-dimensional (3D) part drag. The system may include an infrared image capture device to capture a plurality of thermal images of a 3D part build region of a 3D printing device on which a part is built, and an image analysis module to detect drag of the part based on a difference image produced by subtracting a first thermal image from a second thermal image.

The infrared image capture device captures images in an infrared electromagnetic spectrum. The image capture device is a forward-looking infrared (FLIR) camera. The system may include an ablation laser to remove the protrusion from the part along an x,y plane in response to a detection of the protrusion by the image analysis module. Detecting drag of the part based on the difference image produced by subtracting the first thermal image from the second thermal image comprises detecting thermal variations within the difference image, the thermal variations defining a drag instance.

Examples described herein also provide a method of detecting three-dimensional (3D) part drag. The method may include, with an infrared image capture device, capturing a plurality of thermal images of a build region of a 3D printing device on which a part is built, and detecting drag of the part based on a difference image produced by subtracting a first thermal image from a second thermal image. Detecting drag of the part based on the difference image may include identifying abnormally cold regions within the difference image, monitoring the abnormally cold regions for a plurality of layers for variations in process parameters, determining whether the abnormally cold regions get warmer over the plurality of layers, and in response to a determination that the abnormally cold regions get warmer over the plurality of layers, taking a remedial action to correct the part drag.

The remedial action includes adjusting a layer thickness of a deposited layer, adjusting an amount of an agent deposited on the build region, adjusting torque output by a material spreader, removing protrusions from the along the x,y plane with an ablation laser, heating the build material with the ablation laser, abandoning the build of a layer of the part, abandoning the build of the part, initiating a new build of the part, adjusting the printing parameters of a print agent, or combinations thereof. The remedial action comprises correcting operation of a translatable device, replacing the translatable device, presenting a warning of a drag event, or combinations thereof. The remedial action comprises tagging the part as a confirmed draggable part.

The method may include determining whether a protrusion of the part along an x,y plane of the build region will come into contact with a layer deposition device, and, in response to a determination that the protrusion of the part will come into contact with the layer deposition device, adjusting a layer thickness of a deposited layer, adjusting an amount of an agent deposited on the build region, adjusting torque output by a material spreader, or combinations thereof.

Examples described herein provide a non-transitory computer readable medium including computer usable program code embodied therewith. The computer usable program code may, when executed by a processor, capture a plurality of thermal images of a build region of a 3D printing device on which a part is built with an infrared image capture device, detect drag of the part based on a difference image produced by subtracting a first thermal image from a second thermal image, and take a remedial action to correct the part drag in response to a determination that a drag instance has occurred.

Detecting drag of the part based on the difference image includes identifying abnormally cold regions within the difference image, monitoring the abnormally cold regions for a plurality of layers for variations in process parameters, determining whether the abnormally cold regions get warmer over the plurality of layers, and, in response to a determination that the abnormally cold regions get warmer over the plurality of layers, take the remedial action to correct the part drag. The remedial action comprises tagging the part as a confirmed draggable part, abandoning the build of the part, initiating a new build of the part, activate an electromagnetic wave source to heat up the cold regions, or combinations thereof.

The computer readable medium may include computer usable program code to, when executed by a processor, locate thermal anomalies with printing agent print data, correlate printing agent print data to the part drag, and store the correlation in a data storage device.

Turning now to the figures, FIG. 1 is an elevational block diagram of an additive manufacturing device (100), according to an example of the principles described herein. The additive manufacturing device (100) may be any device that produces three-dimensional (3D) objects by building up layers of material and combining those layers using adhesives, heat, chemical reactions, and other coupling processes, and may include, for example, a 3D printing device. The additive manufacturing device (100) may form or include a grazing light system for detecting 3D part lift and drag that may occur within the additive manufacturing device (100). Throughout the examples described herein, the lifting of a part (i.e., the formation of protrusions on the part above a surface of the build material abnormally) is the cause of dragging of the part, and dragging of the part within the build region (151) of the 3D printing device is a failure event that is sought herein to be reduced or eliminated.

The additive manufacturing device (100) may include a build region (151) at which the parts are built. The part (101) depicted in FIG. 1 has been formed through successive layers of build material (150) being placed on top of one another, and a portion of the part (101) formed exists in lower layers of the build material. As the part (101) is built, conditions may exist that create a protruding portion (102) of the part (101). The protruding portion (102) extends above an x,y plane of the build material (150) when this occurs, and it is the lifting and possible dragging that the systems and methods described herein are seeking to correct.

The additive manufacturing device (100) may also include at least one image capture device (152) to capture an image of the build region (151) as illuminated by the grazing light (125). The field of view of the image capture device (152) is indicated by lines 153. In one example, the image capture device (152) may be a thermographic camera that senses infrared radiation and captures images of the build region (151) in this spectrum. In this example, the image capture device (152) may be a forward-looking infrared (FLIR) camera. The image capture device (152) may also capture images of the build region (151) in any of a number of wavelengths including ultraviolet (UV) wavelengths, visible wavelengths, infrared (IR) wavelengths, and combinations thereof. In other words, the image capture device (152) may capture images in a visible electromagnetic spectrum, an infrared electromagnetic spectrum, an ultraviolet electromagnetic spectrum, and combinations thereof. Further, the image capture device (152) may be a red-green-blue (RGB) camera, a monochromatic camera, a spectral camera, or combinations thereof. In an example, a plurality of image capture devices (152) may be included in the additive manufacturing device (100) in order to capture images in a variety of spectrums.

Figure 2:
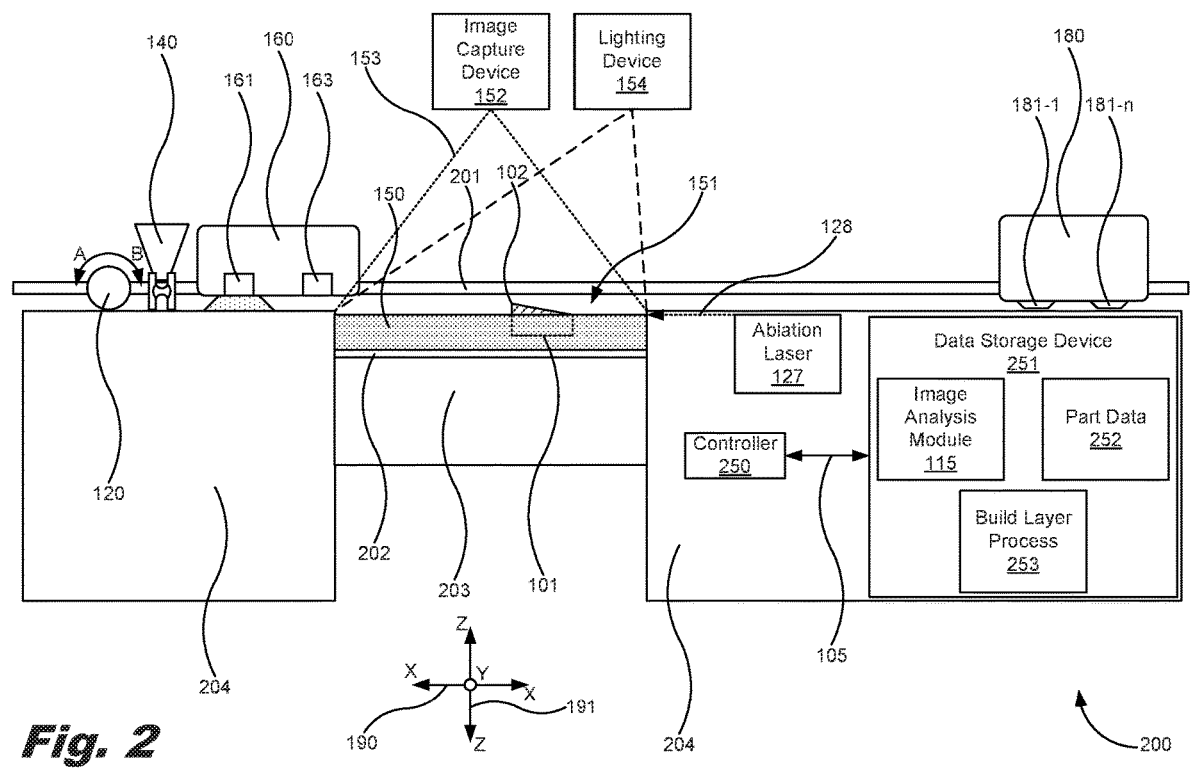
FIG. 2 is an elevational block diagram of an additive manufacturing device, according to an example of the principles described herein.

The additive manufacturing device (100) may also include an image analysis module (115) to detect lift and drag of the part (101) based on a difference image produced by subtracting a first thermal image from a second thermal image. The build region (151) is heated throughout the build process of the part (101). Further, where the part is formed, heat is concentrated through the application of a printing agent such as a fusing or sintering agent that causes the build material (150) to fuse or sinter together in layers. Thus, as the parts (101) are built, the parts (101) experience a relatively higher temperature than surrounding build material (150) even though the build material (150) surrounding the parts (101) is also subjected to heating via, for example, a warming lamp (FIG. 2, 161). The thermal differences between the parts (101), the surrounding build material (150) and boarders between the parts (101) and the surrounding build material (150) may be detected and identified by the image capture device (152).

A plurality of images may be captured by the image capture device (152), and the image analysis module (115) may compare the plurality of images to one another in order to detect the protrusion (102) of the part (101). In one example, a first image of the build region (151) may be captured where the build region (151) does not include printed parts or where reference parts are printed without user-desired parts having been printed. This first image may serve as a control or reference image. Subsequent images may be captured as the user-desired parts are also printed. In one example, a number of images are captured for each layer of build material deposited in the build region (151).

In the examples described herein, an ambient light source may be included, and may include an artificial light included within the additive manufacturing device (100), sunlight illuminating the build region (151), and combinations thereof.

In order to isolate, obtain, and identify a lift and/or drag instances in the part (101), a series of images of the build region (151) may be captured using the image capture device (152) at a first layer and at a second layer to obtain a first image and a second image. The image analysis module (115) obtains a difference image produced by subtracting the first image from the second image. In the examples described herein, the images captured and subtracted from one another are thermal images. The image analysis module (115) identifies abnormally cold regions within the difference image, monitors the abnormally cold regions for a plurality of layers for variations in process parameters, and determines whether the abnormally cold regions get warmer over the plurality of layers.

In response to a determination that the abnormally cold regions get warmer over the plurality of layers, a number of remedial actions may be taken by the additive manufacturing device (100) to correct the part drag. The remedial measures may include, for example, adjusting a layer thickness of a deposited layer of the build material (151), adjusting an amount of printing agent deposited on the build region (151) by a printing agent dispenser (FIG. 2, 180), adjusting a torque output by a material spreader (FIG. 2, 120), activate an electromagnetic wave source such as an energy emitting device (FIG. 2, 160), removing protrusions from the along the x,y plane with an ablation laser (FIG. 2, 127), heating the build material (150) with the ablation laser (FIG. 2, 127), abandoning the build of a layer of the part (101), abandoning the build of the part (101) altogether, initiating a new build of the part (101), adjusting the printing parameters of a print agent, correcting operation of a translatable device (120, 140, 160, 180), replacing the translatable device (120, 140, 160, 180), presenting a warning of a drag event to a user, tagging the part (101) as a confirmed draggable part, tagging parts (101) within the build that have been affected by the dragging of the part (101), and combinations thereof.

FIG. 2 is an elevational block diagram of an additive manufacturing device (200), according to an example of the principles described herein. The additive manufacturing device (200) of FIG. 2 includes those elements described above in connection with the additive manufacturing device (100) of FIG. 1 and includes additional elements. These elements will now be described in more detail. The additive manufacturing device (200) may be implemented in or in connection with an electronic device. Examples of electronic devices include desktop computers, laptop computers, personal digital assistants (PDAs), mobile devices, smartphones, gaming systems, and tablets, among other electronic devices. The additive manufacturing device (200) may be implemented as a standalone device that includes the logic and circuitry to perform the methods described herein.

The additive manufacturing device (200) may be utilized in any data processing scenario including, stand-alone hardware, mobile applications, through a computing network, or combinations thereof. Further, the additive manufacturing device (200) may be used in a computing network, a public cloud network, a private cloud network, a hybrid cloud network, other forms of networks, or combinations thereof. In one example, the methods provided by the additive manufacturing device (200) are provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the additive manufacturing device (200) are executed by a local administrator.

To achieve its desired functionality, the additive manufacturing device (200) includes various hardware components. Among these hardware components may be a controller (250) and a data storage device (251). These hardware components may be interconnected through the use of a number of busses and/or network connections such as via a bus (105).

The controller (250) may include the hardware architecture to retrieve executable code from the data storage device (251) and execute the executable code. The executable code may, when executed by the controller (250), cause the controller (250) to implement at least the functionality of operating the various elements of the additive manufacturing device (200). Further, the executable code may, when executed by the controller (250), with an infrared image capture device, capture a plurality of thermal images of the build region (151) of the additive manufacturing device (200) on which a part (101) is built, and detect lift and/or drag of the part based on a difference image produced by subtracting a first thermal image from a second thermal image. Still further, the executable code may, when executed by the controller (250), identify abnormally cold regions within the difference image, monitor the abnormally cold regions for a plurality of layers for variations in process parameters, determine whether the abnormally cold regions get warmer over the plurality of layers, and, in response to a determination that the abnormally cold regions get warmer over the plurality of layers, taking a remedial action to correct the part drag. Even further, the executable code may, when executed by the controller (250), determine whether a protrusion (102) of the part (101) along an x,y plane of the build region (151) will come into contact with a layer deposition device (120, 140, 160, 180), and, in response to a determination that the protrusion (102) of the part (101) will come into contact with the layer deposition device (120, 140, 160, 180), adjust a layer thickness of a deposited layer, adjust an amount of an agent deposited on the build region, adjust torque output by the material spreader (120), or combinations thereof. These and other functions of the executable code, when executed by the controller (250), are performed according to the methods of the present specification described herein. In the course of executing code, the controller (250) may receive input from and provide output to a number of the remaining hardware units.

The data storage device (251) may store data such as executable program code that is executed by the controller (250) or other processing device. As will be discussed, the data storage device (251) may specifically store computer code representing a number of applications that the controller (250) executes to implement at least the functionality described herein. The data storage device (251) may include various types of memory modules, including volatile and nonvolatile memory. For example, the data storage device (251) of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device (251) as may suit a particular application of the principles described herein. In certain examples, different types of memory in the data storage device (251) may be used for different data storage needs. For example, in certain examples the controller (250) may boot from Read Only Memory (ROM), maintain nonvolatile storage in the Hard Disk Drive (HDD) memory, and execute program code stored in Random Access Memory (RAM). The data storage device (251) may include a computer readable medium, a computer readable storage medium, or a non-transitory computer readable medium, among others. For example, the data storage device (251) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The additive manufacturing device (200) further includes a number of elements used to form the parts (101) within the build region (151). The additive manufacturing device (200) may include a build platform (202). In one example, the build platform (202) may be removeable or separable from the remainder of the additive manufacturing device (200). The build platform (202) may move in the z-direction indicated by arrow (191). More specifically, the build platform (202) may move in the downward z-direction as indicated by arrow (191) to allow for successive layers of build material (150) and printing agent to be deposited at the same level as every other layer of deposited build material (150) and printing agent. In one example, the build platform (202) may move between 60 and approximately 100 micrometers (μm) in the downward direction between sequential layers of deposited build material (150).

The additive manufacturing device (200) may include a material spreader (120) and at least one hopper (140) movably coupled to a carriage (201) and translatable in the X-direction indicated by arrow (190). The material spreader (120) and hopper (140) may make a plurality of passes over the build platform (202) dispensing and spreading build material (150) across the build platform (202), and the carriage (201) may be used to move the material spreader (120) and the hopper (140) in either direction as indicated by arrow (190) as it may be instructed by the controller (250).

The material spreader (120) may be, for example a roller that spans one planar dimension of the build platform (202) to form a level and uniform layer of the build material (150) along the surface of the build platform (202). In one example where the material spreader (120) is a roller, the roller may counter-rotate such that the roller rotates in a direction opposite to its movement relative to the build platform (202). Throughout this description, the terms "material spreader" and "roller" may be used interchangeably.

A hopper (140) may be any device that dispenses an amount of build material for spreading by the material spreader (120). In one example, the hopper (140) may deposit build material (150) in front of and behind the material spreader (120) as the hopper (140) and the material spreader (120) translate above and across the build platform (202). Thus, the hopper (140) may dispense a plurality of doses of the build material in front of the progression of the material spreader (120) as the material spreader (120) is moved over the build platform (202). Although one hopper (140) is depicted in FIG. 2, any number of hoppers (140) may be included in the additive manufacturing device (200). In one example, the hopper (140) may be moved between a front and behind position relative to the movement of the material spreader (120) so that the hopper (140) may dispense the build material (150) in front of and behind the material spreader (120) relative to the materials spreader's direction of travel across the build platform (202). Arrow (190) indicates that the material spreader (120) and the hoppers (140) may move bi-directionally in the X-direction such that material may be dispensed and spread along the build platform (202) in two directions of travel. Throughout the specification and figures, the right direction of arrow (190) is the positive x-direction, and the left direction of arrow (190) is the negative x-direction. Further, the up direction of arrow (191) is the positive z-direction, and the down direction of arrow (191) is the negative z-direction.

In one example, a stage (204) may be included on either side of the build platform (202) to allow for build material (150) to be deposited on the stage (204), and spread from the stage (204) to the build platform. In one example, an amount or dose of build material (150) may be deposited on either side of the build platform (202) and on the stage (204), and the material spreader (120) may spread the build material (150) from the stage (204) from either X-direction as indicated by arrow (190). In one example, the hopper (140) may spread build material (150) over the build platform (202). In one example, excess build material (150) may be staged or deposited on either side of the stage (204) before being spread over the build platform (202) to allow the material spreader (120) to spread this build material (150) in a subsequent pass over the build platform (202) and stage (204).

The additive manufacturing device (200) may also include a controller (250) used to control the functions and movement of the various elements of the additive manufacturing device (200) described herein. For example, the controller (250) may control the movement of the carriage (201) and, in turn, the movement of the build material dispensing device (201) and its elements over the stage (204) and build platform (202). Further, the controller (250) may control the movement of the build platform (202) relative to the stage (204). Still further, the controller (250) may control the quantity of build material (150) and printing agent deposited by the elements moveably coupled to the carriage (201).

The build platform (202) may be supported by build platform base (203). The build platform (202) and/or the build platform base (203) may be moveably coupled to the stage (204) to allow for the build platform (202) and the build platform base (203) to be moved up and down in order to form layers of the 3D object with the build material (150) and the agent.

The material spreader (120) and the hoppers (140) which form the additive manufacturing device (200) are moveably coupled to the carriage (201). The carriage (201) may traverse a length of the additive manufacturing device (200) so that the additive manufacturing device (200) may move over the entirety of the build platform (202). The carriage (201) may include a carriage drive shaft, a carriage coupling device and other devices to couple a material spreader (120), the hoppers (140), an energy emitting device (160), a printing agent dispenser (180), or combinations thereof to the carriage (201). In one example, a plurality of carriages (201) may be included on the additive manufacturing device (200) to move the material spreader (120), the hoppers (140), the energy emitting device (160), and the printing agent dispenser (180), independently or collectively.

The additive manufacturing device (200) may also include an energy emitting device (160). The energy emitting device (160) is moveably coupled to the carriage (201) and may move along with the additive manufacturing device (200) in order to warm the build material (150) and/or fuse, sinter, bind, or cure the build material (150). Thus, the energy emitting device (160) may be any device that emits electromagnetic energy at any wavelength to warm and/or fuse or sinter the build material (150), a printing agent; and a combination of build material and printing agent. In one example, the energy emitting device (160) may include at least one warming lamp (161) that emits electromagnetic energy sufficient to warm the build material (150) deposited or spread along the surface of the stage (204) and the build platform (202). Warming of the build material (150) serves to prepare the build material (150) for solidification including, for example binding or thermal fusing. Further, the electromagnetic radiation from the warming lamp (161) serves to maintain the build material (150) and the object being formed from the build material (150) at a relatively more uniform and non-fluctuating temperature. In the case of thermal binding systems, if the build material (150) and the object being formed are allowed to cool or otherwise fluctuate in temperature, the part (101) or layers thereof may become warped, and this warping may form the protrusions (102) of the part (101).

The energy emitting device (160) may also include at least one fusing lamp (163). The fusing lamp (163) emits electromagnetic energy sufficient to fuse the build material (150) together through the use of the printing agent. Fusing of the build material a layer at a time serves to form the part (101) (i.e., a 3D object). With the warming lamp (161) warming the build material (150), the fusing lamp (163) may fuse the build material (150) where the printing agent has been printed and in all coordinate directions within the part (101) including between layers of fused build material (150) by allowing the warming lamp (161) to keep previous, solidified layers at a fusible temperature and fusing the build material (150) spread across the previous, fused layer to fuse to the layer of build material (150) to the previous layer. In one example, the energy emitting device (160) may include one warming lamp (161) and three fusing lamps (163). In one example, the fusing lamps (163) may remain on or activated during the build processes described herein. The build material (150), without fusing or printing agents deposited thereon, may absorb a small amount of energy from the fusing lamps. In another example, the voltage to the fusing lamps (163) may be lowered when the build platform (202) is being warmed or a fusing or binding process is not being performed in order to reduce power consumption.

In one example, the warming lamp (161) and/or the fusing lamp (163) may be point sources such as a laser device or other columnated light source. This allows the warming lamp (161) and/or the fusing lamp (163) to directly address cooler portions of the build material (150) and the parts (101).

The additive manufacturing device (200) may also include a printing agent dispenser (180) to dispense a printing agent onto the build material (150) spread along the surface of the build platform (202). The printing agent may include, for example, active ingredients, detailing agents (DA), fusing agents, sintering agents, other printing agents, and combinations thereof, that may be used to bring about the fusing or sintering of the build material (150) and compensate for a rise in temperature among the layers of the part being printed. The printing agent dispenser (180) may be moveably coupled to the carriage (201), and may move with the energy emitting device (160) over the surface of the build platform (202). The printing agent dispenser (180) may include at least one fluidic die (181-1, 181-*n*, collectively referred to herein as 181) used to dispense a volume of the printing agent onto the build material (150). In the example of FIG. 2, the printing agent dispenser (180) includes two fluidic die (181-1, 181-*n*), but may include any number of fluidic die (181) as denoted by the "n" in 181-*n*. In one example, the fluidic die (181) may be digitally addressable such that the printing agent may be dispensed on the build material (150) that is spread across the surface of the build platform (202) in a pattern as defined by part data (252) provided to the additive manufacturing device (200). Wherever the fluidic die (181) of the printing agent dispenser (180) dispenses the printing agent onto the build material (150) spread across the build platform (202), the fusing lamp (163) will fuse the build material (150) and form a layer of the 3D object.

The additive manufacturing device (200) may also include logic and circuitry to cause the material spreader (120), the hopper (140), the energy emitting device (160), the printing agent dispenser (180), the build platform (202), and the build platform base (203) to move and actuate in a manner that produces the part (101) based on part data (252) stored in a data storage device (251) of the additive manufacturing device (200). For example, the additive manufacturing device (200) may include the controller (250). The controller (250) may include the hardware architecture to retrieve executable code from the data storage device (251) and execute the executable code as described herein. The executable code may, when executed by the controller (250), cause the controller (250) to implement at least the functionality of sending signals to the material spreader (120), the hopper (140), the energy emitting device (160), the printing agent dispenser (180), the build platform (202), and the build platform base (203) to instruct these devices to perform their individual functions according to the methods of the present specification described herein. In the course of executing code, the controller (250) may receive input from and provide output to a number of the remaining hardware units.

The additive manufacturing device (200) may also include at least one lighting device (154). Although one lighting device (154) is depicted in FIG. 2, any number of lighting devices (154) may be included within the additive manufacturing device (200). Each of the lighting devices (154) may be independently activated to allow for different intensities of light to be projected onto the build region (151). Further, each of the lighting devices (154) may provide heat to the build region (151) and may also provide different wavelengths of light including different colors within the visual spectrum of electromagnetic radiation as well as wavelengths with higher or lower frequencies such as IR and UV light. In this manner, a variety of different lighting may be provided to the build region (151) in order for the image capture device (152) to capture images of the build region (151) in different lighting. Providing a variety of different lighting via the lighting devices (154) may allow for the image analysis module (115) described herein to analyze and detect protrusions (102) of the parts (101) and their dimensions with more accuracy and precision.

The part data (252) stored in the storage device (251) may be obtained from an external source such as, for example, a computer-aided design (CAD) system that provides a CAD model of the 3D object defined by the part data (252) and may be in any format such as, for example, a 3D printing file format, a 3D manufacturing format (3MF) file format, stereolithography (STL) file format, additive manufacturing format (AMF) file format, Wavefront Object (OBJ) file format, virtual reality modeling language (VRML) file format, X3D XML-based file format, Filmbox (FBX) file format, initial graphics exchange specification (IGES) file format, ISO 10303 (STEP) file format, point cloud data from a 3D scan of an object, other types of 3D printing file formats, and combinations thereof. The build layer process (253) may be any data stored in the data storage device (251) that defines the process the controller (250) follows in instructing the material spreader (120), the hopper (140), the energy emitting device (160), the printing agent dispenser (180), the build platform (202), and the build platform base (203) to produce the part (101) over a number of build material (150) and printing agent layers.

The material spreader (120) may include a material spreading roller that counter-rotates such that it rotates in a direction opposite to its movement relative to the build platform. Thus, if the additive manufacturing device (200) including the material spreader (120) and the hopper (140) move in the positive x-direction as indicated by arrow (190), then the roller will rotate in the direction of arrow A. In contrast, if the additive manufacturing device (200) including the material spreader (120) and the hopper (140) move in the negative x-direction as indicated by arrow (190), then the roller will rotate in the direction of arrow B.

In addition, the additive manufacturing device (200) may include an ablation laser (127). The ablation laser (127) may be used to remove the protrusion (102) of the part (101). The ablation laser (127) may emit electromagnetic radiation (127) sufficient to ablate material. Thus, the ablation laser (127) may be any laser device that can remove or sublimate material from a solid surface by irradiating it with a culminated beam of electromagnetic radiation. At low laser flux, the fused or sintered build material may be heated by the absorbed laser energy and evaporates or sublimates. At high laser flux, the fused or sintered build material may be converted to a plasma. Thus, laser ablation refers to removing material with a pulsed laser, or ablating material with a continuous wave laser beam in situations where the laser intensity is high enough. Excimer lasers of deep ultra-violet light may be used in photoablation, and may output wavelengths of approximately 200 nm. Further, in some examples, the ablation laser (127) may be used to quickly heat the build material (150) in locations within the build region (151) where the build material has cooled in order to stop the formation of a protrusion (102) on the part (101) and reduce or eliminate the likelihood of a drag event occurring.

In one example, the ablation laser (127) may be mounted on an articulating arm that allows the ablation laser to move from a position along the x,y plane of the build material (150) and build region (151) to an overhead position where the ablation laser may be used to quickly warm the build material (150) in areas where the build material (150) is detected as being too cold to allow for the build material (150) to properly fuse or sinter. In instances where a drag instance has occurred, the ablation laser (127) may be used to aid in the recovery of the part (101) after a lift instance or a drag instance, or assist in providing heat to the part or correct a lift instance where the part is detected as being abnormally cool such that successive layers of build material may not correctly fuse or sinter to previous layers. In these examples, the ablation laser (127) assists in remediating a lift instance or a drag instance.

The additive manufacturing device (200) may further include a number of modules used in the implementation of the methods and systems described herein. The various modules within the additive manufacturing device (200) include executable program code that may be executed separately. In this example, the various modules may be stored as separate computer program products. In another example, the various modules within the additive manufacturing device (200) may be combined within a number of computer program products; each computer program product including a number of the modules.

Figure 3:
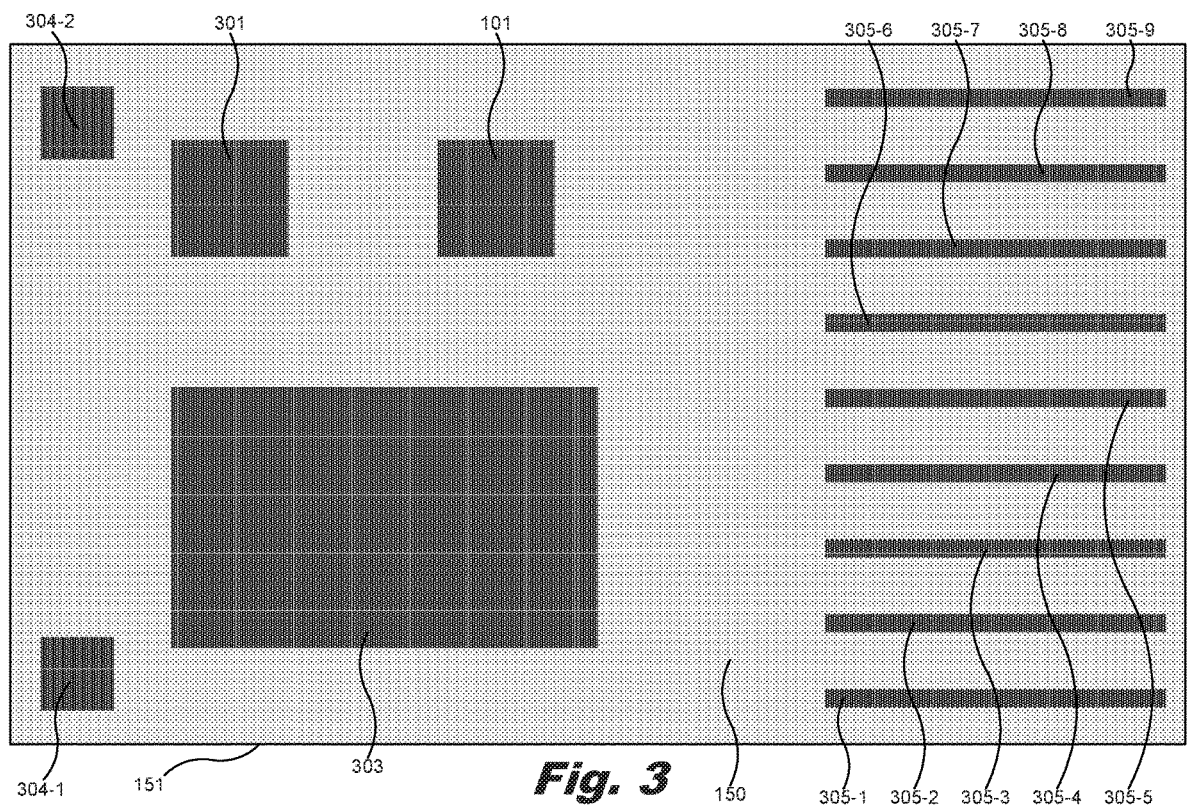
FIG. 3 is a block diagram of an image of a build region including a number of parts being printed, according to an example of the principles described herein.
Figure 4:
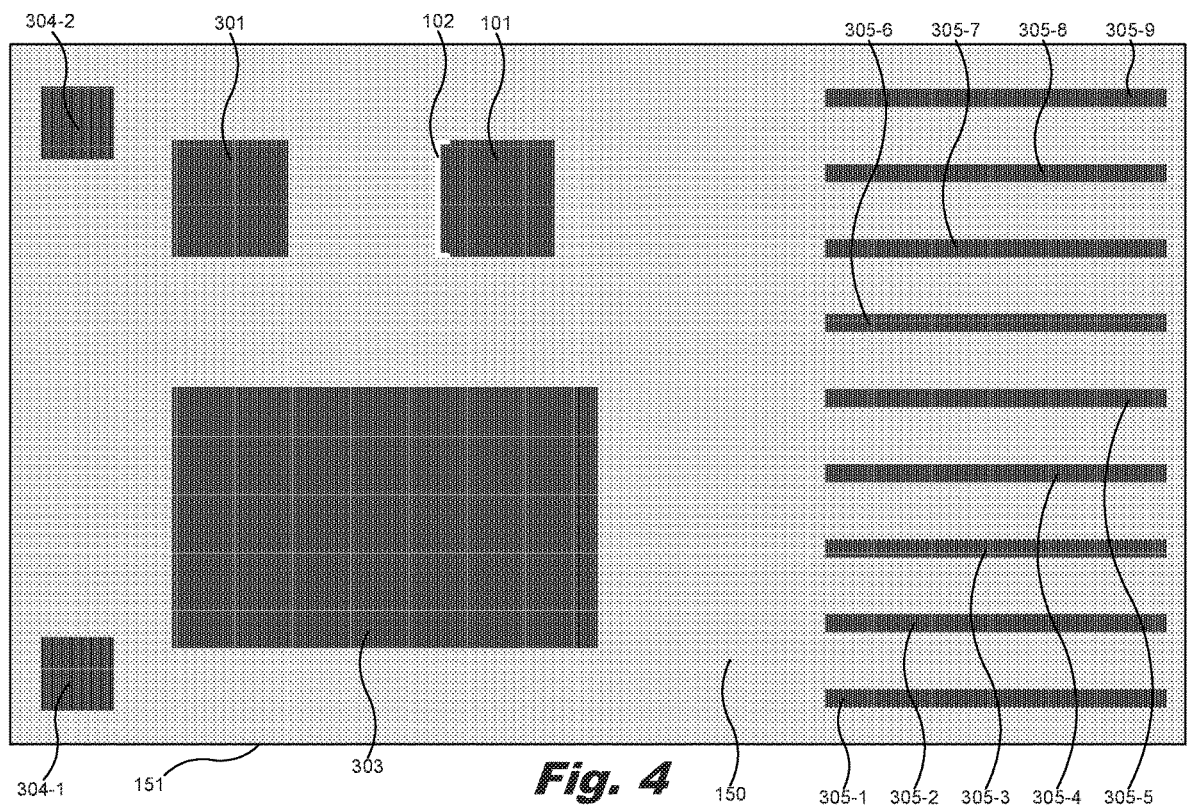
FIG. 4 is a block diagram of an image of a build region including a number of parts being printed and with a protruding portion of one of the parts, according to an example of the principles described herein.
Figure 5:
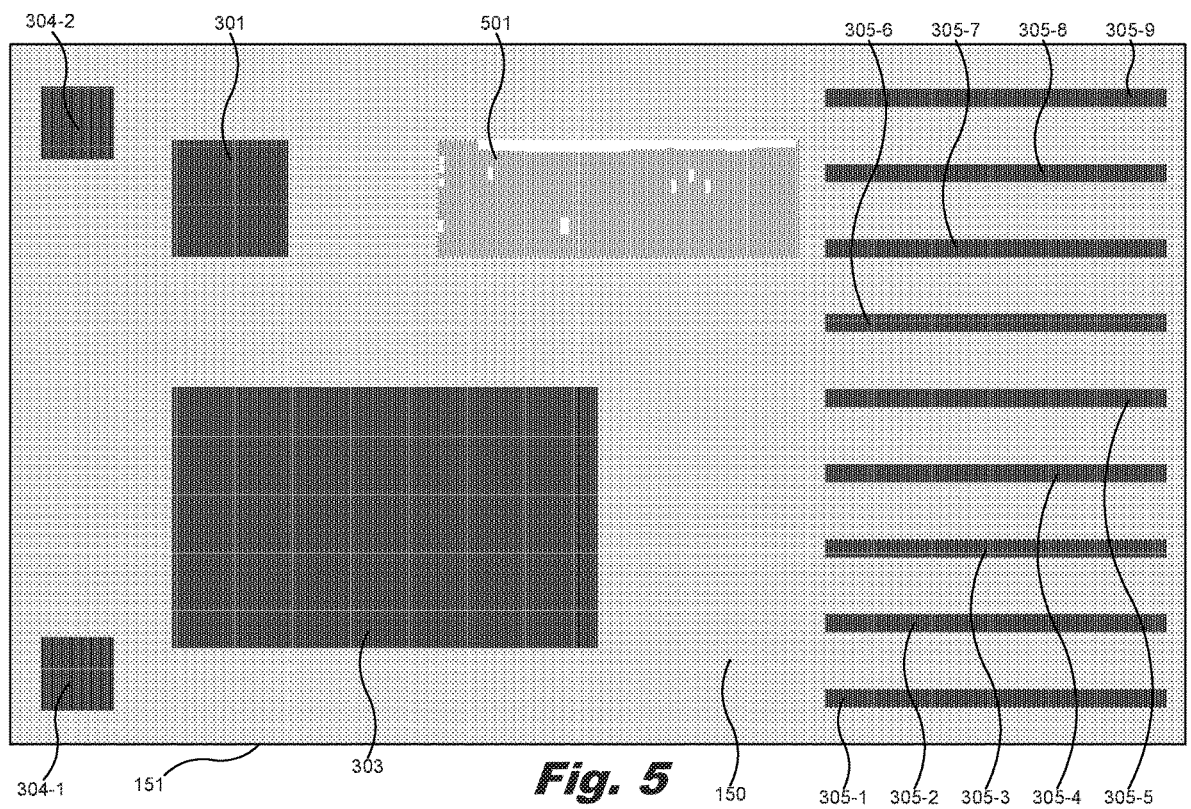
FIG. 5 is a block diagram of an image of a build region including a number of parts being printed and with one of the parts being subjected to a drag instance, according to an example of the principles described herein.
Figure 6:
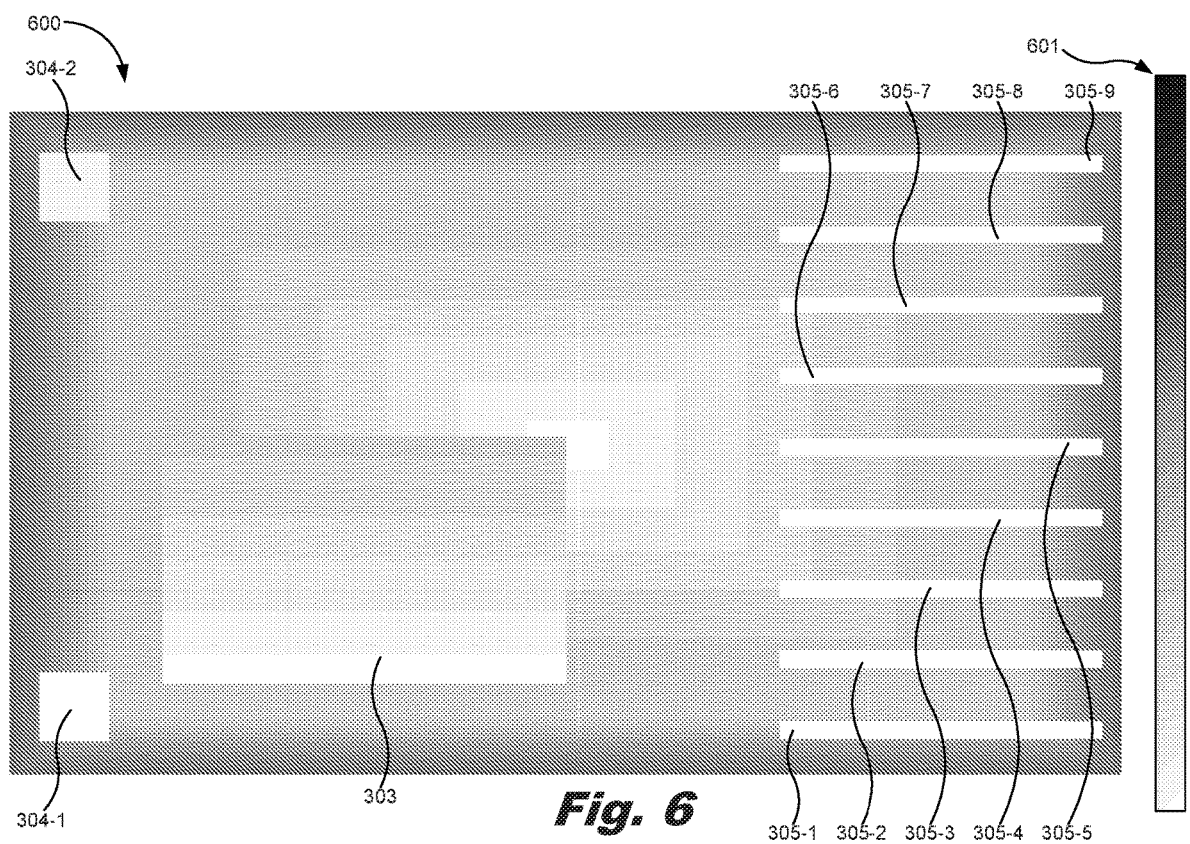
FIG. 6 is a block diagram of a thermal image of a build region previous to printing of a target part, according to an example of the principles described herein.
Figure 7:
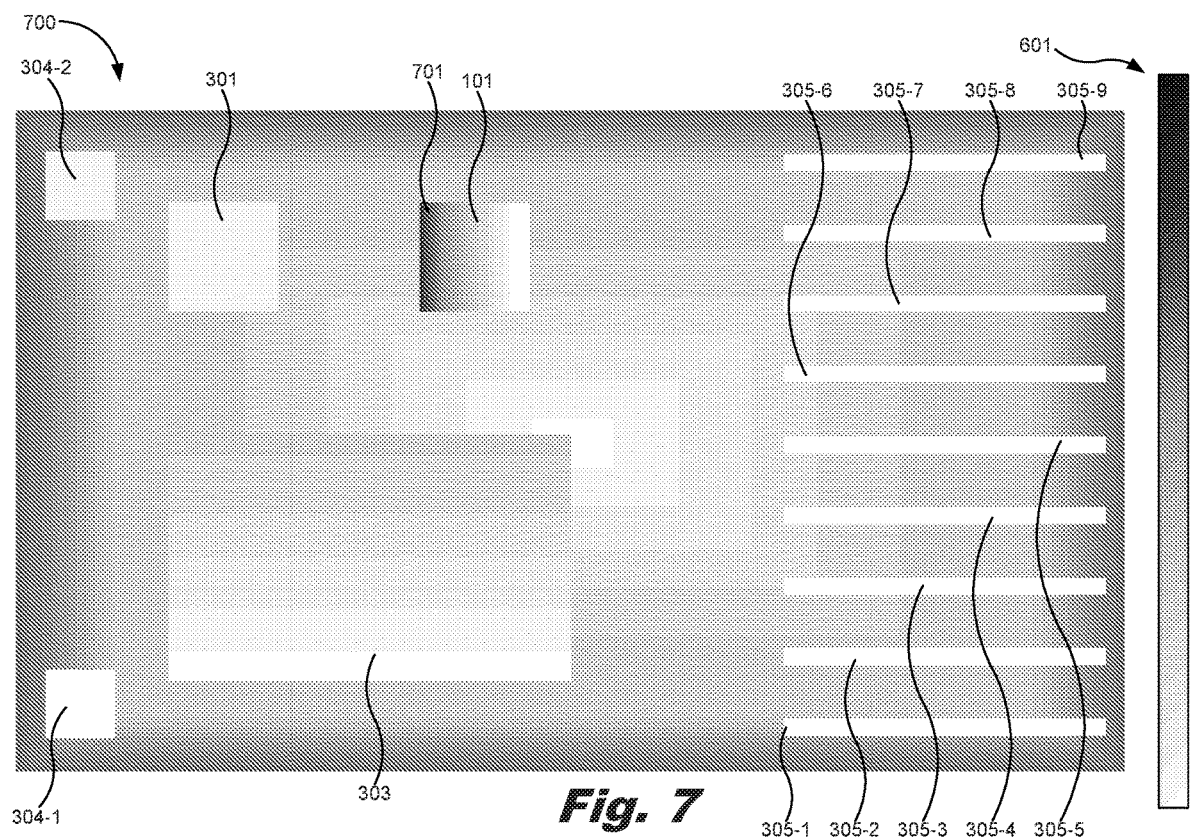
FIG. 7 is a block diagram of a thermal image of a build region including a lifted part previous to a part drag event, according to an example of the principles described herein.
Figure 8:
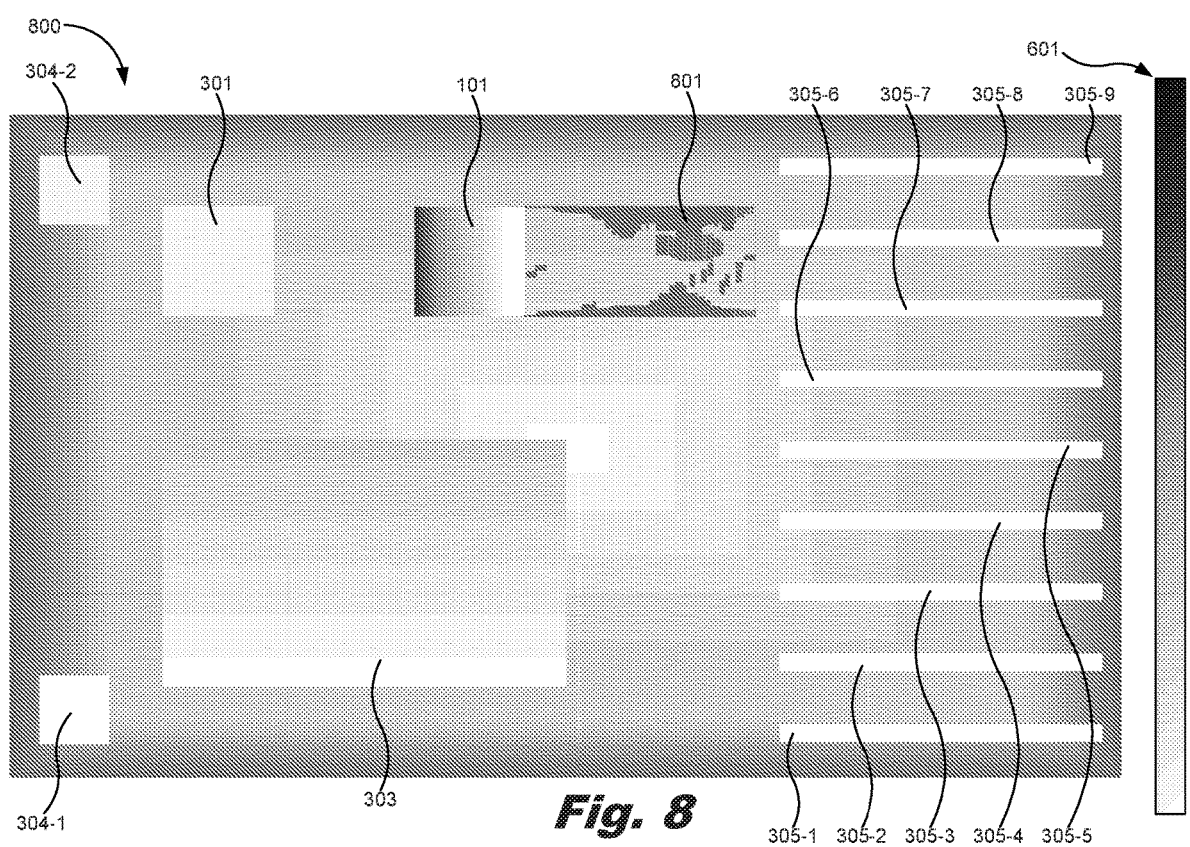
FIG. 8 is a block diagram of a thermal image of a build region including a lifted part after a part drag event, according to an example of the principles described herein.
Figure 9:
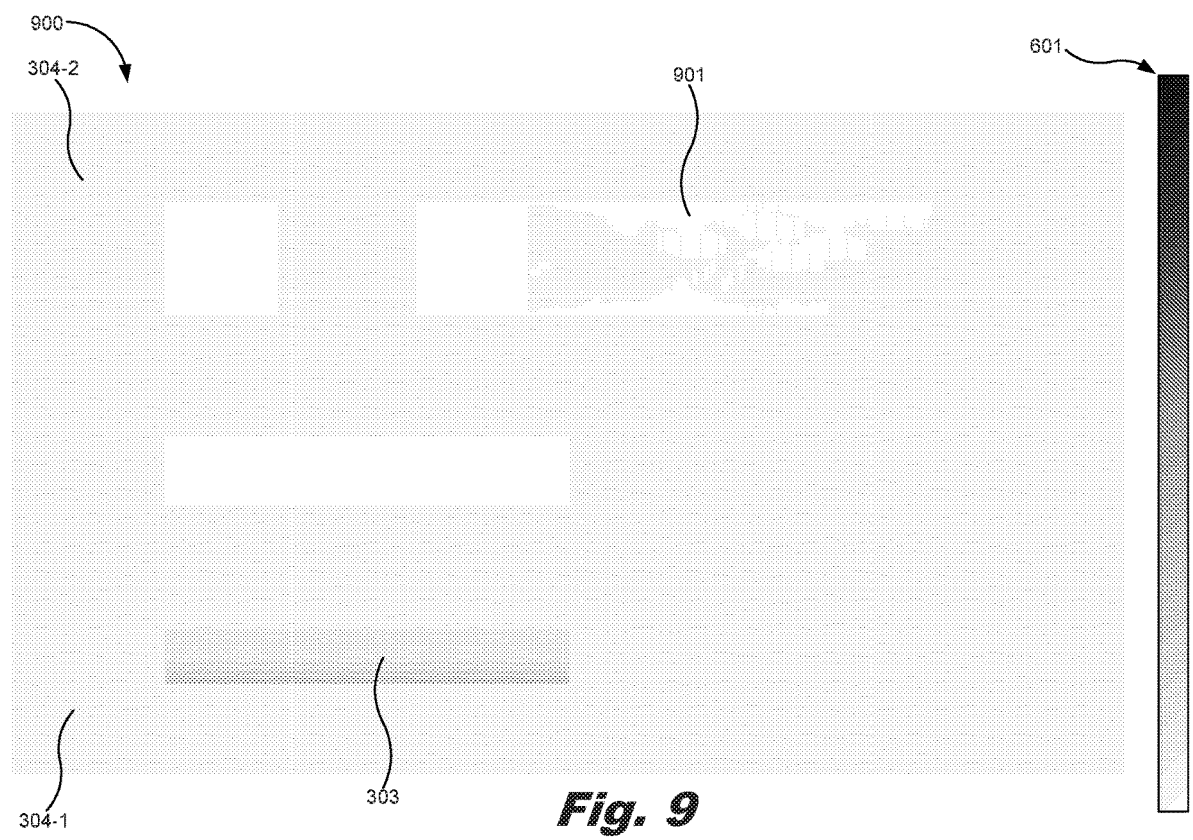
FIG. 9 is a block diagram of a differential thermal image of a build region including an indication of a part drag event, according to an example of the principles described herein.

The additive manufacturing device (200) may include the image analysis module (115) described herein. The function of the image analysis module (115) and the remainder of the elements of the additive manufacturing device (200) will now be described in connection with FIGS. 3 through 9. FIG. 3 is a block diagram of an image of a build region (151) including a number of parts (101, 301, 303, 304-1, 304-2, 305-1, 305-2, 305-3, 305-4, 305-5, 305-6, 305-7, 305-8, 305-9, collectively referred to herein as 101) being printed, according to an example of the principles described herein. Further, FIG. 4 is a block diagram of an image of a build region (151) including a number of parts (101) being printed and with a protruding portion (102) of one of the parts (101), according to an example of the principles described herein. FIG. 5 is a block diagram of an image of a build region (151)

including a number of parts (101) being printed and with one of the parts (101) being subjected to a dragging (501), according to an example of the principles described herein. FIG. 6 is a block diagram of a thermal image (600) of a build region previous to printing of a target part (101), according to an example of the principles described herein. FIG. 7 is a block diagram of a thermal image (700) of a build region including a lifted part (100) previous to a part drag event (501), according to an example of the principles described herein. FIG. 8 is a block diagram of a thermal image (800) of a build region including a lifted part (101) after a part drag event (501), according to an example of the principles described herein. FIG. 9 is a block diagram of a differential thermal image (900) of a build region (151) including an indication of a part drag remnant (901), according to an example of the principles described herein. FIGS. 3 through 5 may be sequential layers of build materials applied to one another in the z-direction (FIG. 2, 191) such as, for example, layers 1259, 1260, and 1261 of the build, respectively. Further, each of the parts (101, 301, 303, 304-1, 304-2, 305-1, 305-2, 305-3, 305-4, 305-5, 305-6, 305-7, 305-8, 305-9) have begun to be printed with part (101) being the target part that FIG. 3 through is described herein as experiencing a lifting and dragging instance. FIGS. 6 through 9 include a temperature indicator (601) where darker shades of grey and black indicate cooler temperatures within each of the images (600, 700, 800, 900). In an example, the temperature indicator (601) may be presented to a user in any color scheme rather than a greyscale temperature indicator (601).

At layer 1259 depicted in FIG. 3, no protrusions are present. When the images are captured by the image capture device (152), a plurality of images may be captured. For example, a control image (600) such as one depicted in FIG. 6 may be captured which includes an image of the build region (151) where no parts or a number of calibration parts such as parts (304-1, 304-2, 303, 305-1, 305-2, 305-3, 305-4, 305-5, 305-6, 305-7, 305-8, 305-9) are depicted. This control image may serve as a baseline as to how the temperatures within the build region (151) change as lift and drag instances occur, and the temperatures of areas or sections within the build regions (151), at boarders between the parts (101) and the build material (151) and within the parts may be compared to other images captured by the image capture device (152) to detect in those subsequent images the presence of a protrusion (102) of a part (101) and drag instances (501). The thermal information within the data representing the subsequent images may be compared to the thermal information in the control image, and any variation may result in the image analysis module (115) detecting a protrusion (102) in the part (101).

In FIG. 4, a protrusion (102) is detected in part (101) of FIG. 4 as the part (101) is being built, and a temperature of the part (101) as depicted in FIG. 7. In FIG. 7, the part (101) includes a relatively cooler region to the left where, in FIG. 4, the part (101) is experiencing the lift instance (102). The cooling of a portion of a part may be indicative of a lift instance (701). The image analysis module (115) may be executed to obtain a differential image by subtracting the image (600) of FIG. 6 from the image (700) of FIG. 7. This may produce a differential image that includes the part (101) with all other parts minimized or removed. This may make it easier for the image analysis module (115) to identify the lift instance (701) in the images. In an example, the image analysis module (115) may identify cooler areas in parts (101) based on a temperature level of the cooler areas (e.g., how dark the image gets based on the temperature indicator (601) where darker shades of grey and black indicate cooler temperatures within each of the images (600, 700, 800, 900)). A threshold may be set by the user or included as executable code within the image analysis module (115) as to what temperatures are cool enough within a part (101) that indicates that a lift instance (701) has occurred. In one example, temperatures of approximately 150° F. and lower within any portion of the part (101) may indicate lift has occurred or will occur, and the threshold may be set at this value. In one example, the image analysis module (115) may be able to determine the height of the protrusion (FIG. 4, 102) based on the sensed temperature. In this example, the temperature detected at a portion of the part (101) may correlate with a height detected after the part (101) has been inspected. This correlation data may be stored in the data storage device (251) as a look-up table to assist in such a determination. The correlation data may be different as the materials such as the build material (150) and the printing agents are adjusted or change. The height of the protrusion (102) may be indicative of the severity of the lift of the part (101) (i.e., the protrusion (102)) and may be used to determine how much energy may be used by the ablation laser (127) to remove the protrusion (102). Further, the height of the protrusion (102) may be used to determine whether the protrusion (102) will come into contact with any of the translatable elements of the additive manufacturing device (100, 200) such as the material spreader (120), the hopper (140), the energy emitting device (160), the printing agent dispenser (180), or combinations thereof. Correlating data that defines the correlation between temperature within the part (101) and the height of the protrusion (102) that forms the lift instance (701) may be stored in a look-up table in, for example, the data storage device (251).

FIG. 5, being a layer after the layer depicted in FIG. 4, may include the dragging (501). In the example of FIG. 5, the dragging (501) has occurred because the protrusion (102) of the part (101) was above a threshold where the material spreader (120), the hopper (140), the energy emitting device (160), or the printing agent dispenser (180) pulled the part (101) through the build material (150). The dragging (501), in this example, has ruined or disturbed at least one layer of the build material (151), and could possibly damage other parts (101) such as parts (305-6, 305-7, 305-8, 305-9) that are also being printed and are located near the part (101). Further, the dragged part (101) may damage any of the translatable devices such as the material spreader (120), the hopper (140), the energy emitting device (160), the printing agent dispenser (180), or combinations thereof if they are the devices that drag the part (101) or even if they come into contact with the dragged part (101) after the dragging (501) has occurred.

In an example, a number of sequential or non-sequential images of layers in a build may be captured and compared to one another including images of the build regions (151) depicted in FIGS. 3 through 5. FIG. 6 is a control image of the build region (151) including parts (303, 304-1, 304-2, 305-1, 305-2, 305-3, 305-4, 305-5, 305-6, 305-7, 305-8, 305-9). FIG. 7 includes parts (101, 301) and includes a temperature gradient within part (101) that is indicative of the lift instance (701). The cooler left edge of the part (101) indicates that the part (101) at the left side has not undergone a complete fusing or sintering, and this is indicative of the temperature differential between the left and right sides of the part (101). This abnormal cooling of the left side of the part (101) assists the image analysis module (115) in identifying the lift instance (701) that matches the protrusions (102) of the part (101).

FIG. 8 includes a drag instance (801) that indicates the presence of the dragging (501) in the corresponding image of FIG. 5. The temperature at the drag instance (801) indicates that the build material (150) within the drag instance (801) has been disturbed and has cooled due to the disturbance. This abnormal cooling of the build material (150) as the part (101) is dragged through the build material (151) may be identified by the image analysis module (115) as being abnormal or past a threshold that indicates a drag instance (801) indicative of the dragging (501).

In one example, the part (101) may include colored portions within the shell or outer portions of the part while the interior portions may not be colored. In this example, a gradient of temperatures from the relatively cooler surface to the relatively hotter core may also cause part lifting. This gradient of temperatures may be used to identify lifting, but identification of bottom surface agent density "geology" between layers that cause part lift, and modifying the bottom surface layer density geology may be used to prevent part lift in future parts. To prevent part lift, the gradient may be reduced by increasing the temperature of the build material below the bottom surface. In one example, a threshold may be used by the image analysis module (115) to identify whether the gradient of outer layer temperatures is different from the inner layer temperatures of the pat (101) beyond that threshold. If the threshold is met or exceeded, then the additive manufacturing device (100, 200) may take remedial measures to reduce the gradient of temperatures within the pat (101) including modifying a bottom surface layer density of the part (101).

The image analysis module (115), when determining the lift instance (701) from the protrusion (102) of the part (101) and the drag instance (801) of the dragging (501), the image analysis module (115) may capture a first image of a first layer and a second image of a second layer and either compare the first and second images or subtract the first image from the second image to obtain a differential thermal image (FIG. 9, 900) that includes the part drag remnant (901). From the comparison of the first image and the second image or the differential thermal image (FIG. 9, 900), the image analysis module (115) may decipher the lift instance (701) and the drag instance (801) from the captured images. Thus, each of the images captured by the image analysis module (115) includes thermal information within the data representing the images. The analysis performed by the image analysis module (115) may be performed between each image and its subsequent image in order to determine whether a protrusion (102) has formed on any of the parts (101) or the part (101) has be dragged.

In one example, the image analysis module (115) may identify abnormally cold regions within the differential thermal image (FIG. 9, 900), and monitor for the abnormally cold regions for a plurality of layers for variations in process parameters. Here, the process parameters may include, for example, power levels of the energy emitting device (FIG. 2, 163), scan speeds of the energy emitting device (FIG. 2, 163), warming lamp (FIG. 2, 161) power levels, warming lamp (FIG. 2, 161) scan speeds, build material (151) temperatures, humidity levels, build material (151) dose volumes, material spreader (FIG. 2, 120) rotation velocities, material spreader (FIG. 2, 120) transverse velocities, fusing agent density levels, cooling agent density levels, build material (151) melting points, build material (151) crystallization temperatures, build material (151) conductivity, build material (151) thermal mass values, build material (151) thermal properties, build material (151) densities, build material (151) flowability, build material (151) friction properties, build material (151) mechanical properties, part model (e.g., part data (252)) used, a number of layers assigned to a core of the part model used, a number of layers assigned to a mantle of the part model used, a number of layers assigned to a shell of the part model used, part post processing methods used, percentage of part expansion of an original geometry of the part, percentage of part dilation of the original geometry of the part, or combinations thereof.

The image analysis module (115) may also determine whether the abnormally cold regions get warmer over the plurality of layers, and, in response to a determination that the abnormally cold regions get warmer over the plurality of layers, taking a remedial action to correct the part drag. In situations where the abnormally cold regions get warmer over the plurality of layers, this may be indicative of part lift in the layers that included the abnormally cold regions. Thus, layers of build material (150) deposited on the layers including the abnormally cold regions may be lifted due to the layers including the abnormally cold regions. In one example, a fluctuation of approximately 10° F. between the layers including the abnormally cold regions and the relatively warmer layers may be enough of a temperature difference to create the protrusion (102) in the part (101). For example, if the abnormally cold region is approximately 150° F. or lower, and these abnormally cold regions warm up to approximately 160° F., the protrusion (102) may be formed. In one example, a threshold of a minimum temperature of a layer may be set, and the application of relatively warmer layers of build material (150) deposited thereon may be set so that the additive manufacturing device (100, 200) may use this threshold to take the remedial action.

The remedial measures may include, for example, adjusting a layer thickness of a deposited layer of the build material (151), adjusting an amount of printing agent deposited on the build region (151) by a printing agent dispenser (FIG. 2, 180), adjusting a torque output by a material spreader (FIG. 2, 120), activate an electromagnetic wave source such as an energy emitting device (FIG. 2, 160), removing protrusions from the along the x,y plane with an ablation laser (FIG. 2, 127), abandoning the build of a layer of the part (101), abandoning the build of the part (101) altogether, initiating a new build of the part (101), adjusting the printing parameters of a print agent, correcting operation of a translatable device (120, 140, 160, 180), replacing the translatable device (120, 140, 160, 180), presenting a warning of a drag event to a user, tagging the part (101) as a confirmed draggable part, tagging parts (101) within the build that have been affected by the dragging of the part (101), warn a user of a possible drag instance or of an actual drag instance, wiping of nozzles of the printing agent dispenser (FIG. 2, 180), and combinations thereof.

The image analysis module (115) may also determine whether the protrusion (102) of the part (101) along the x,y plane of the build region (151) will come into contact with a layer deposition device. The layer deposition device may include any of the material spreader (120), the hoppers (140), the energy emitting device (160), the printing agent dispenser (180), or combinations thereof. In response to a determination that the protrusion (102) of the part (101) will come into contact with the layer deposition device (120, 140, 160, 180), the image analysis module (115) may adjust a layer thickness of a deposited layer of build material (150), adjust an amount of an printing agent such as a DA, fusing agents, sintering agents, other printing agents, and combinations thereof deposited on the build region (151), adjust torque output by the material spreader (120), or combinations thereof.

In an example, the image capture device (152) may be used to capture an image of the build region (151), and the controller (250) may execute the image analysis module (115). The image analysis module (115) may set a number of thresholds of thermal data and identify areas within the images where the thermal measurements are above and below the thresholds. In this manner, the image analysis module (115) is able to identify protruding portion (102) of the part (101) depicted in FIG. 7 as the lift instance (701) and the dragging (501) of the part (101) depicted in FIG. 8 as the drag instance (801). For example, the lift instance (701) and the drag instance (801) in FIGS. 7 and 8 may be identified by the image analysis module (115). In an example, the image analysis module (115) may observe violations of an upper control limit (UCL) and a lower control limit (LCL) of the lift instance (701) and the drag instance (801). The UCL and the LCL may be thresholds set by the image analysis module (115) to determine when the protrusion (102) exceeds a height that may cause a part dragging (501) as depicted in FIG. 5.

In one example, the image analysis module (115) may utilize printing agent print data to locate thermal anomalies, and correlate the printing agent print data to defect types such as the protruding portion (102) of the part (101) depicted in FIG. 7 as the lift instance (701) and the dragging (501) of the part (101) depicted in FIG. 8 as the drag instance (801). The printing agents may include detailing agents (DA), fusing agents, sintering agents, other printing agents, and combinations thereof. The printing agent print data includes data representing the deposition patterns of the printing agent deposited by the printing agent dispenser (FIG. 2, 180) in order to form the part (101). The printing agent print data may be included as part of the part data (FIG. 2, 252) stored in the data storage device (FIG. 2, 251). The print agent density may be modified based on instructions made by the image analysis module (115) once the lift instance (701) or the drag instance (801) have been identified in order to reduce the likelihood of future lift instances (701) and drag instances (801).

In this example, the printing agent print data may include data representing the density of the print agent that is to be deposited on the build material (151). The printing agent print data may be aligned to the thermal images captured by the image capture device (152) to locate boundaries of the part in the x,y plane relative to the captured thermal images. The thermal image temperature anomaly locations may be located relative to the location of the part within the captured images through execution of the image analysis module (115). The image analysis module (115) may categorize the thermal image temperature anomaly locations to correlate with defect type signatures that occur at each location category. The location categories may include, for example, within the part (101) core, along the part (101) edges in the leading and trailing spread and print directions, in the build material (151) regions upstream and downstream of the parts (101) in the spread and print directions, other location categories, and combinations thereof.

The difference between a print agent density as defined by the printing agent print data of a current layer and the print agent density as defined by the printing agent print data of previous layers may define a gradient of agent density change in the z-direction indicated by arrow (191). The thermal image temperature anomaly locations may be located relative to a map of the gradient of agent density change that defines the upper and lower surfaces of the part (101) (i.e., the first and last layers of the part (101) as printed). The thermal image temperature anomaly locations may be located relative to the gradient of agent density change in the z-direction, and may be categorized to correlate with defect types that occur relative to each category of part surface gradients such as, for example, the top surface size and orientation of the part (101), the bottom surface size and orientation of the part (101), and part core region sizes of the part (101), other categories, and combinations thereof. Thermal-model-based part data and previous layer gradient data may define an expected temperature image for parts (101) and build material (151) in the current layer. The measured temperature image obtained from the first image may be subtracted from the expected image to define a thermal anomaly image, and the thermal model may define an expected temperature gradient image for the current to previous layers for the upper and lower surfaces of the part, the part core, and the build material (151) regions. The measured thermal gradient image may be subtracted from the expected gradient image to define a thermal gradient anomaly image, and the temperature anomaly and temperature gradient anomaly images may be used to extract the expected normal temperature from the analysis of unexpected temperature deviations. The anomaly image features are located relative to the part image features to correlate with expected defect types.

Figure 10:
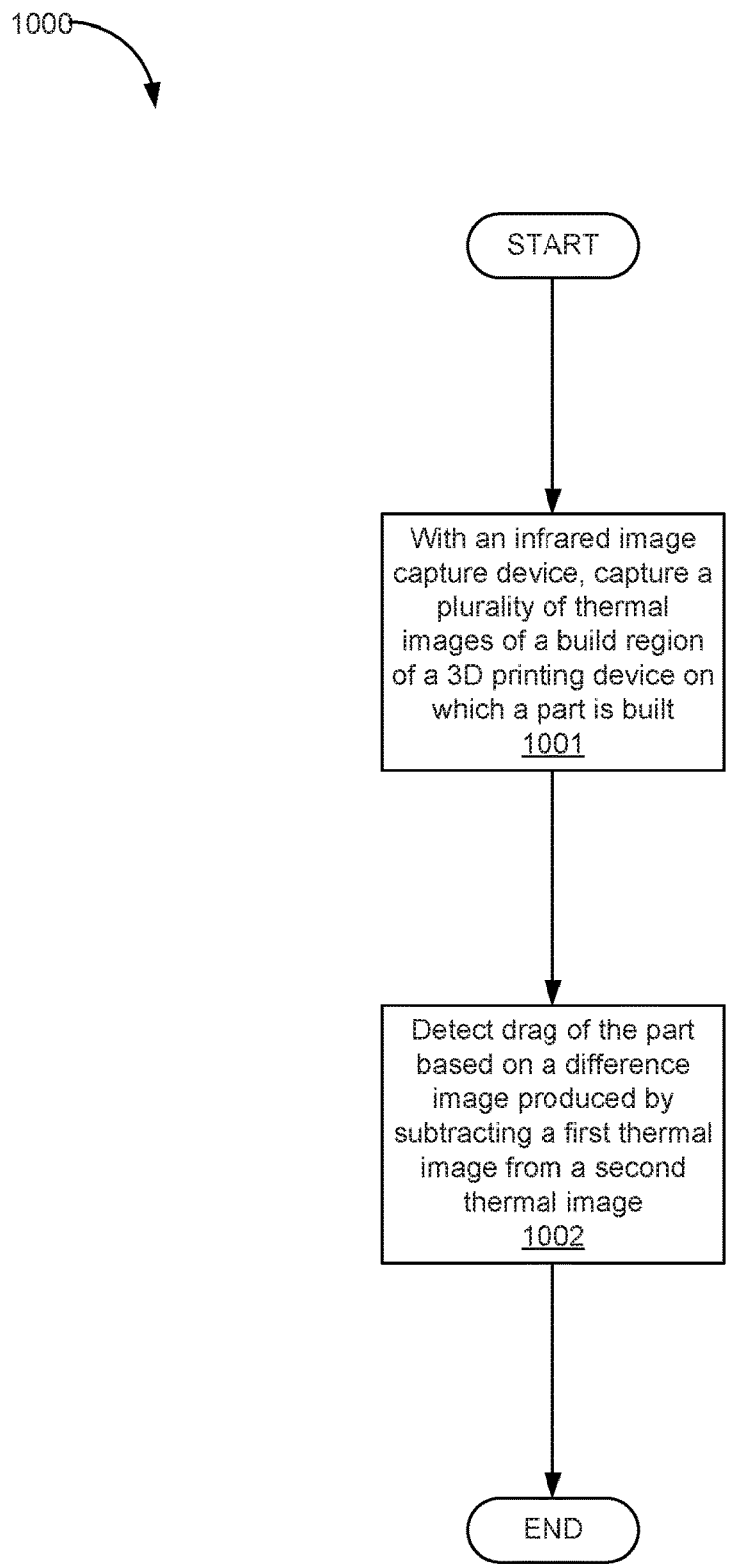
FIG. 10 is a flowchart showing a method of detecting three-dimensional (3D) part drag, according to an example of the principles described herein.

Having described the elements of the additive manufacturing device (100, 200), the methods associated with the additive manufacturing device (100, 200) will now be described. FIG. 10 is a flowchart showing a method (1000) of detecting three-dimensional (3D) part drag, according to an example of the principles described herein. The method (1000) of FIG. 10 may include, with an infrared image capture device (152), capturing (block 1001) a plurality of thermal images of the build region (151) of the additive manufacturing device (100, 200) on which a part (101) is built. A dragging (501) as evidenced by a drag instance (801) of the part (101) may be detected (1002) based on a difference image such as the differential thermal image (900) produced by subtracting a first thermal image such as the image (600) from a second thermal image such as image (800). In this manner, the part drag remnant (901) may be obtained and identified by the additive manufacturing device (100, 200).

Figure 11:
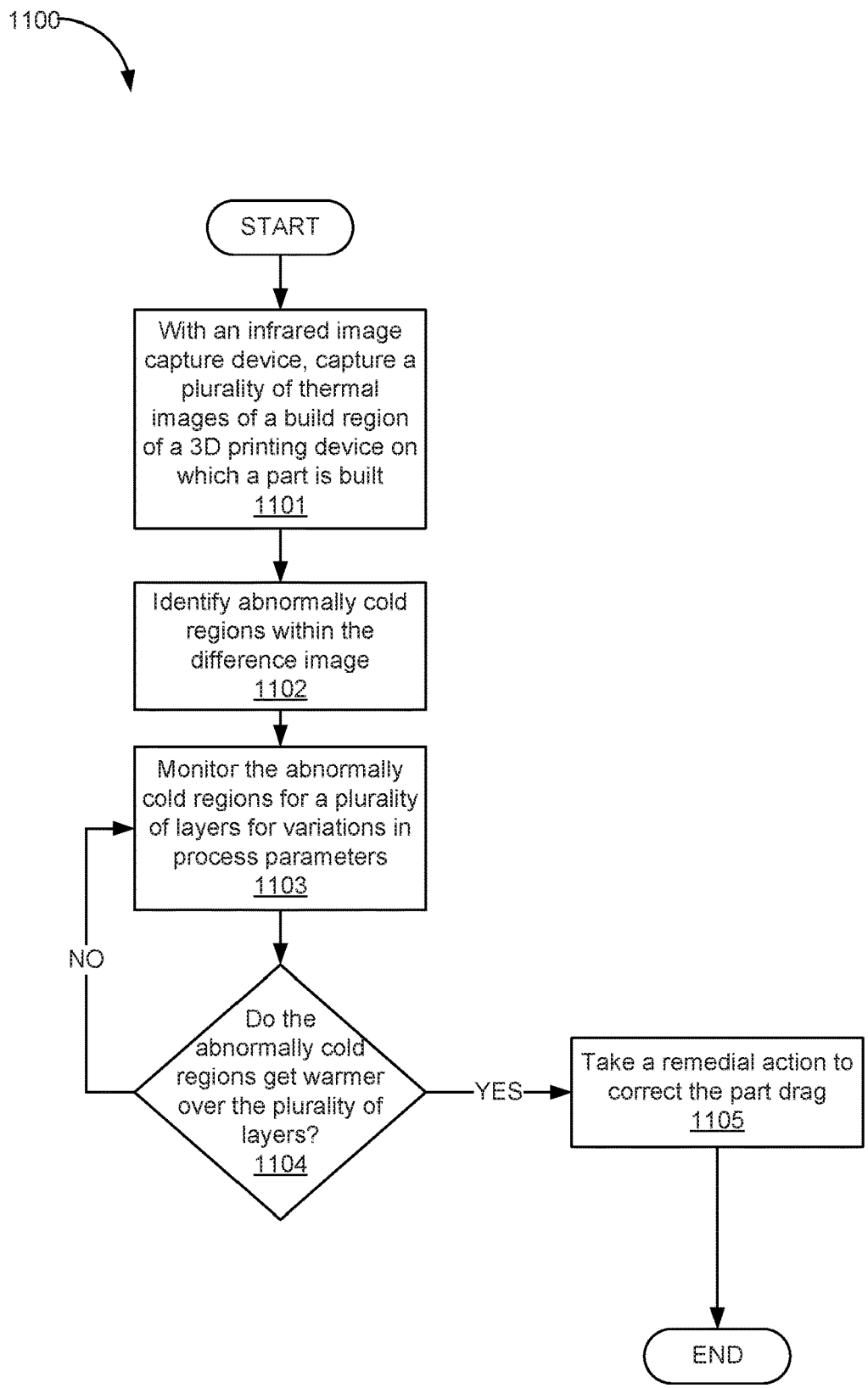
FIG. 11 is a flowchart showing a method of detecting 3D part drag, according to an example of the principles described herein.

FIG. 11 is a flowchart showing a method (1100) of detecting 3D part drag, according to an example of the principles described herein. The method (1100) of FIG. 11 may include, with an infrared image capture device (152), capturing (block 1101) a plurality of thermal images of the build region (151) of the additive manufacturing device (100, 200) on which a part (101) is built. The image analysis module (115) may identify (block 1102) abnormally cold regions within the difference image (900) as these abnormally cold regions are indicative of a protruding portion (102) of the part (101) and/or a part drag event (501).

The image analysis module (115) may monitor the abnormally cold regions for a plurality of layers as the layers are built in the build region (151) for variations in process parameters, and it is determined (block 1104) if the abnormally cold regions get warmer over the plurality of layers of build material (151). In response to a determination that the abnormally cold regions do not get warmer over the plurality of layers of build material (block 1104, determination NO), then the method (1100) may loop back to block 1103 where the layers are monitored again. In contrast, in response to a determination that the abnormally cold regions do get warmer over the plurality of layers of build material (block 1104, determination YES), then a remedial action may be taken (block 1105) by the additive manufacturing device (100, 200) to correct the drag of the part (101).

Figure 12:
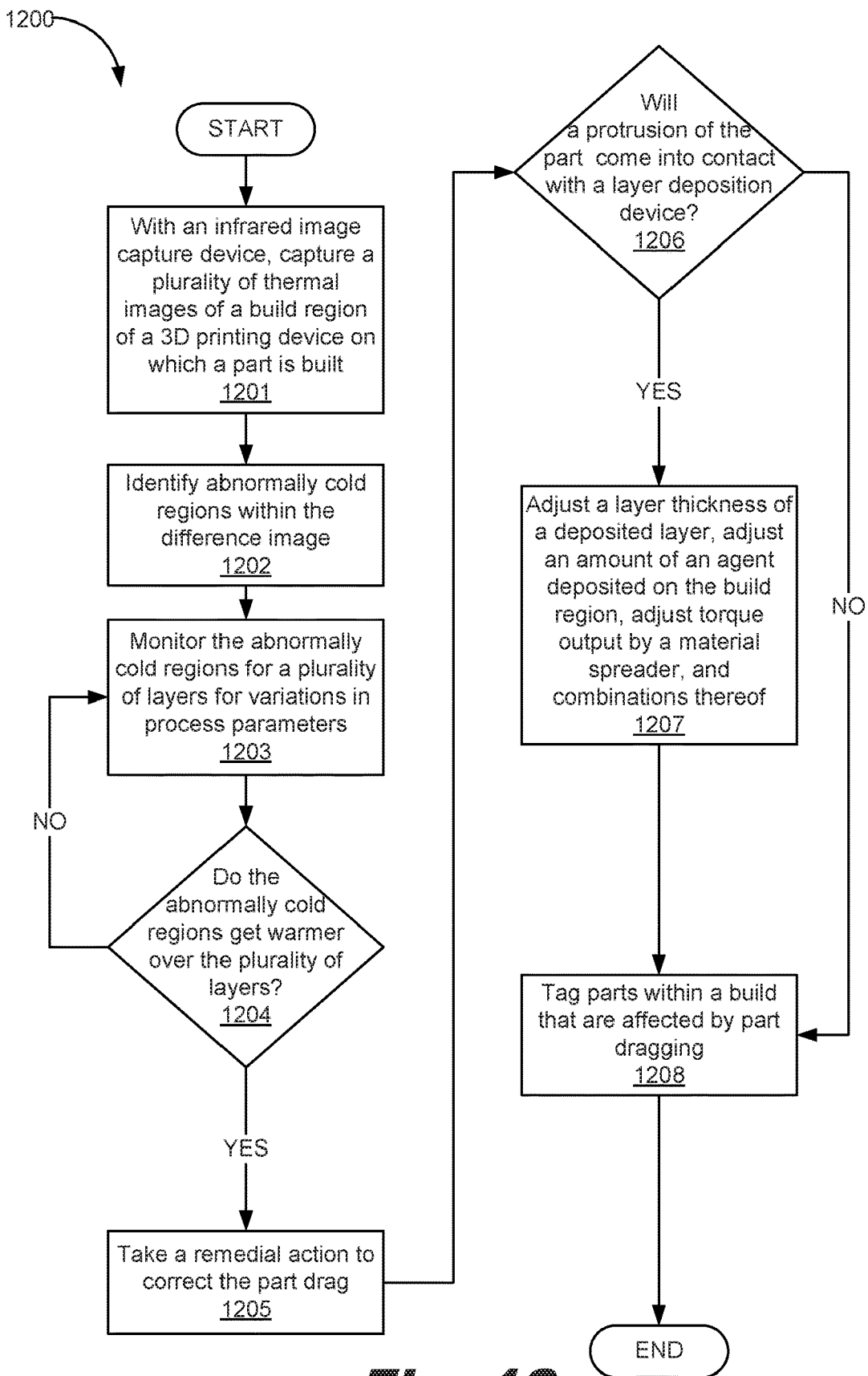
FIG. 12 is a flowchart showing a method of detecting 3D part drag, according to an example of the principles described herein.

FIG. 12 is a flowchart showing a method (1200) of detecting 3D part drag, according to an example of the principles described herein. The method (1200) of FIG. 12 may include, with an infrared image capture device (152), capturing (block 1201) a plurality of thermal images of the build region (151) of the additive manufacturing device (100, 200) on which a part (101) is built. The image analysis module (115) may identify (block 1202) abnormally cold regions within the difference image (900) as these abnormally cold regions are indicative of a protruding portion (102) of the part (101) and/or a part drag event (501).

The image analysis module (115) may monitor the abnormally cold regions for a plurality of layers as the layers are built in the build region (151) for variations in process parameters, and it is determined (block 1204) if the abnormally cold regions get warmer over the plurality of layers of build material (151). In response to a determination that the abnormally cold regions do not get warmer over the plurality of layers of build material (block 1204, determination NO), then the method (1200) may loop back to block 1203 where the layers are monitored again. In contrast, in response to a determination that the abnormally cold regions do get warmer over the plurality of layers of build material (block 1204, determination YES), then a remedial action may be taken (block 1205) by the additive manufacturing device (100, 200) to correct the drag of the part (101).

The method (1200) may also include a determination (block 1206) as to whether the protrusion (102) of the part (101) extends far enough past the x,y plane of the build region (151) such that the protrusion (102) will come into contact with a layer deposition device (120, 140, 160, 180). This determination (block 1206) may occur at the same time the determination at block 1204 is made. In response to the determination that the protrusion (102) of the part (101) does not extend far enough past the x,y plane of the build region (151) such that the protrusion (102) will come into contact with a layer deposition device (120, 140, 160, 180) (block 1206, determination NO), then the method (1200) may include tagging (block 1208) or otherwise identifying parts (101) within a build that are affected by part dragging. The tagging (block 1208) may also include tagging parts (101) within the build that have been affected by the dragging of the part (101) being analyzed. The tagging (block 1208) of the parts (101) that were affected by part dragging may assist in identifying parts (101) that may not be able to be printed or that may be difficult to print given their history, and may assist in reforming the part and/or changing process parameters in the additive manufacturing device (100, 200). Thus, the tagging (block 1208) of the parts (101) may allow the additive manufacturing device (100, 200) to abandon the printing of a current layer of the part (101) or abandon the part altogether.

In contrast, in response to the determination that the protrusion (102) of the part (101) does extend far enough past the x,y plane of the build region (151) such that the protrusion (102) will come into contact with a layer deposition device (120, 140, 160, 180) (block 1206, determination YES), then a number of process parameters may be adjusted (block 1207) such as, for example, adjusting a layer thickness of a deposited layer of the build material (151), adjusting an amount of printing agent deposited on the build region (151) by a printing agent dispenser (FIG. 2, 180), adjusting a torque output by a material spreader (FIG. 2, 120), activate an electromagnetic wave source such as an energy emitting device (FIG. 2, 160), removing protrusions from the along the x,y plane with an ablation laser (FIG. 2, 127), abandoning the build of a layer of the part (101), abandoning the build of the part (101) altogether, initiating a new build of the part (101), adjusting the printing parameters of a print agent, correcting operation of a translatable device (120, 140, 160, 180), replacing the translatable device (120, 140, 160, 180), presenting a warning of a drag event to a user, tagging the part (101) as a confirmed draggable part, and combinations thereof. The method (1200) may then proceed to block 1208 as described herein.

Figure 13:
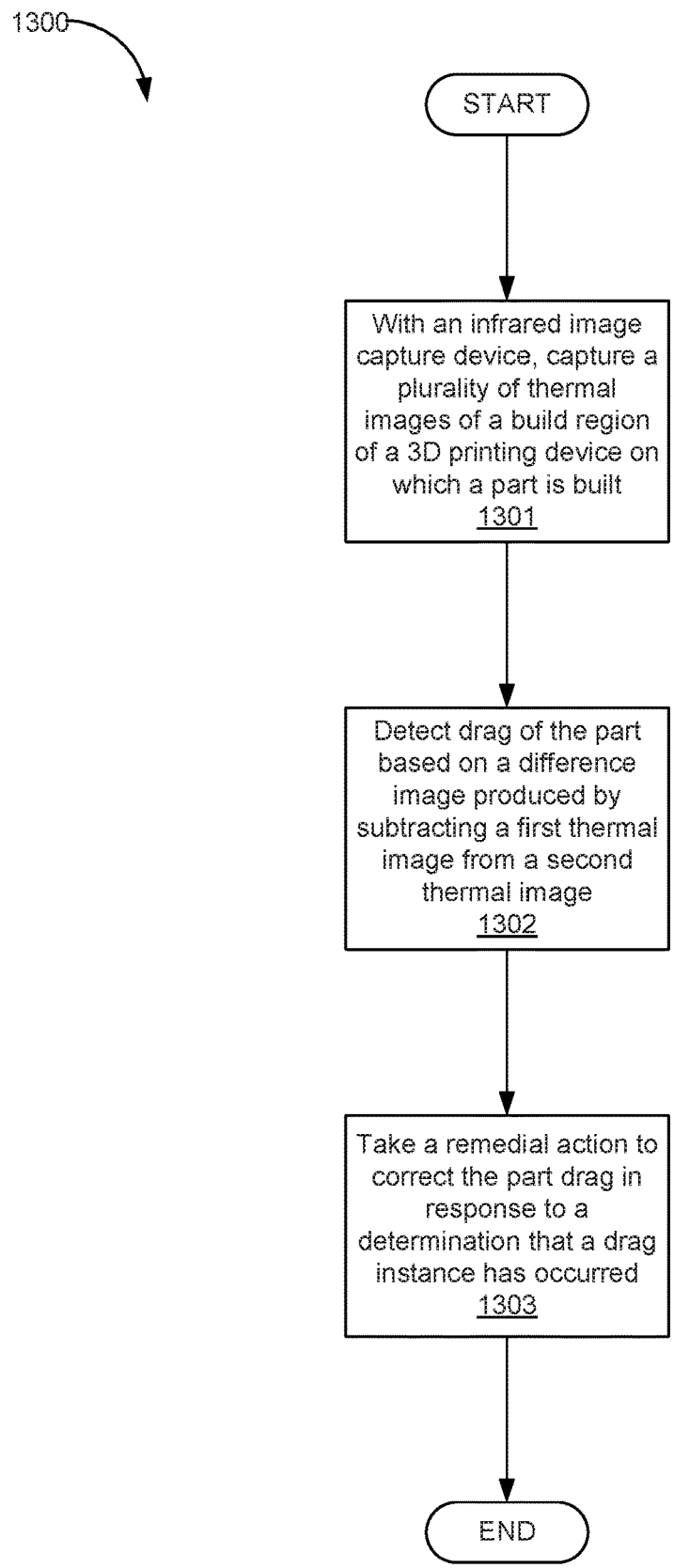
FIG. 13 is a flowchart showing a method of detecting 3D part drag, according to an example of the principles described herein.

FIG. 13 is a flowchart showing a method (1300) of detecting 3D part drag, according to an example of the principles described herein. The method (1300) of FIG. 13 may include, with an infrared image capture device (152), capturing (block 1301) a plurality of thermal images of the build region (151) of the additive manufacturing device (100, 200) on which a part (101) is built. A dragging (501) as evidenced by a drag instance (801) of the part (101) may be detected (1302) based on a difference image such as the differential thermal image (900) produced by subtracting a first thermal image such as the image (600) from a second thermal image such as image (800). In this manner, the part drag remnant (901) may be obtained and identified by the additive manufacturing device (100, 200). A remedial action may be taken (block 1303) to correct the part drag in response to a determination that a drag instance has occurred.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the controller (250) of the additive manufacturing device (100, 200) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe systems and methods for detecting three-dimensional (3D) part drag includes an infrared image capture device to capture a plurality of thermal images of a 3D part build region of a 3D printing device on which a part is built, and an image analysis module to detect drag of the part based on a difference image produced by subtracting a first thermal image from a second thermal image.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for detecting three-dimensional (3D) part drag, comprising:

an infrared image capture device to capture a plurality of thermal images of a 3D part build region of a 3D printing device on which a part is built; and a controller to detect:
- a protrusion of the part elevated away from a bed surface of the 3D part build region; and
- drag of the part across the bed surface of the 3D part build region due to interaction of the protrusion with a translating device of the 3D printing device, the drag being detected based on a difference image produced by subtracting a first thermal image from a second thermal image.

2. The system of claim 1, wherein the infrared image capture device captures images in an infrared electromagnetic spectrum.

3. The system of claim 1, wherein the image capture device is a forward-looking infrared (FUR) camera.

4. The system of claim 1, comprising an ablation laser to remove the protrusion from the part along an x,y plane in response to a detection of the protrusion by the image analysis module.

5. The system of claim 1, wherein detecting drag of the part based on the difference image produced by subtracting the first thermal image from the second thermal image comprises detecting thermal variations within the difference image, the thermal variations defining a drag instance.

6. A method of detecting three-dimensional (3D) part drag, comprising:
with an infrared image capture device, capturing a plurality of thermal images of a build region of a 3D printing device on which a part is built; and
with a controller:
- detecting a protrusion of the part away from a bed surface of the build region by identifying fluctuations in environmental conditions;
- detecting drag of the part across the bed surface of the build region due to interaction of the protrusion with a translating device of the 3D printing device, the drag being detected based on a difference image produced by subtracting a first thermal image from a second thermal image.

7. The method of claim 6, wherein detecting drag of the part based on the difference image comprises:
identifying abnormally cold regions within the difference image;
monitoring the abnormally cold regions for a plurality of layers for variations in process parameters;
determining whether the abnormally cold regions get warmer over the plurality of layers; and
in response to a determination that the abnormally cold regions get warmer over the plurality of layers, taking a remedial action to correct the part drag.

8. The method of claim 7, wherein the remedial action comprises adjusting a layer thickness of a deposited layer, adjusting an amount of an agent deposited on the build region, adjusting torque output by a material spreader, removing protrusions from the along the x,y plane with an ablation laser, heating the build material with the ablation laser, abandoning the build of a layer of the part, abandoning the build of the part, initiating a new build of the part, adjusting the printing parameters of a print agent, modifying a bottom surface layer density of the part, or combinations thereof.

9. The method of claim 7, wherein the remedial action comprises correcting operation of a translatable device, replacing the translatable device, presenting a warning of a drag event, or combinations thereof.

10. The method of claim 7, wherein the remedial action comprises:
tagging the part as a confirmed draggable part; and
tagging parts within the build that have been affected by the dragging of the part.

11. The method of claim 6, comprising:
determining whether a protrusion of the part along an x,y plane of the build region will come into contact with a layer deposition device; and
in response to a determination that the protrusion of the part will come into contact with the layer deposition device, adjusting a layer thickness of a deposited layer, adjusting an amount of an agent deposited on the build region, adjusting torque output by a material spreader, or combinations thereof.

12. A non-transitory computer readable medium comprising computer usable program code embodied therewith, the computer usable program code to, when executed by a processor:
with an infrared image capture device, capture a plurality of thermal images of a build region of a 3D printing device on which a part is built;
detect a protrusion of the part away from a bed surface of the build region;
detect drag of the part across the bed surface of the build region due to interaction of the protrusion with a translating device of the 3D printing device, the drag being detected based on a difference image produced by subtracting a first thermal image from a second thermal image; and
take a remedial action to correct the part drag in response to a determination that a drag instance has occurred.

13. The computer readable medium of claim 12, wherein detecting drag of the part based on the difference image comprises:
identify abnormally cold regions within the difference image;
monitor the abnormally cold regions for a plurality of layers for variations in process parameters;
determine whether the abnormally cold regions get warmer over the plurality of layers; and
in response to a determination that the abnormally cold regions get warmer over the plurality of layers, take the remedial action to correct the part drag.

14. The computer readable medium of claim 13, wherein the remedial action comprises tagging the part as a confirmed draggable part, abandoning the build of the part, initiating a new build of the part, activate an electromagnetic wave source to heat up the cold regions, or combinations thereof.

15. The computer readable medium of claim 12, comprising computer usable program code to, when executed by a processor:
with printing agent print data, locate thermal anomalies;
correlate printing agent print data to the part drag; and
store the correlation in a data storage device.

16. The method of claim 6, wherein detecting a protrusion of the part comprises:
identifying abnormally cold regions within the difference image; and
identifying the abnormally cold regions as a detected protrusion of the part.

17. The method of claim 6, further comprising detecting a height of the protrusion based on the difference image.

18. The computer readable medium of claim 13, wherein the remedial action comprises altering formation of build material below a bottom surface.

19. The computer readable medium of claim 15, wherein locating thermal anomalies with printing agent print data comprises comparing a print agent density of a current layer with print agent density of a previous layer.

20. The computer readable medium of claim 15, further comprising computer usable program code to, when executed by a processor, identify a defect type based on the printing agent print data.

* * * * *